(12) United States Patent
Pinnau et al.

(10) Patent No.: US 7,490,725 B2
(45) Date of Patent: Feb. 17, 2009

(54) REVERSE OSMOSIS MEMBRANE AND PROCESS

(75) Inventors: Ingo Pinnau, Palo Alto, CA (US); Jennifer H. Ly, San Jose, CA (US); Richard W. Baker, Palo Alto, CA (US)

(73) Assignee: Membrane Technology & Research, Menlo Park, CA (US)

( * ) Notice: Subject to any disclaimer, the term of this patent is extended or adjusted under 35 U.S.C. 154(b) by 688 days.

(21) Appl. No.: 10/682,727

(22) Filed: Oct. 9, 2003

(65) Prior Publication Data

US 2005/0077243 A1 Apr. 14, 2005

(51) Int. Cl.
*B01D 39/00* (2006.01)
*B01D 29/00* (2006.01)
*B01D 39/14* (2006.01)
*B01D 53/22* (2006.01)
*B05D 1/34* (2006.01)

(52) U.S. Cl. ............. 210/490; 210/500.38; 210/500.27; 427/296; 95/45; 95/49; 96/11

(58) Field of Classification Search ................. 210/652, 210/490, 500.38, 500.27, 653, 654; 427/296; 95/49, 45; 96/11
See application file for complete search history.

(56) References Cited

U.S. PATENT DOCUMENTS

| | | | |
|---|---|---|---|
| 3,133,132 A | 5/1964 | Loeb et al. | |
| 3,133,137 A | 5/1964 | Loeb et al. | |
| 3,980,456 A * | 9/1976 | Browall | 96/13 |
| 4,214,020 A * | 7/1980 | Ward et al. | 427/296 |
| 4,277,344 A | 7/1981 | Cadotte | |
| 4,305,824 A | 12/1981 | Uemura et al. | |
| 4,872,984 A | 10/1989 | Tomaschke | |
| 4,927,540 A * | 5/1990 | Wessling et al. | 210/638 |
| 4,948,507 A | 8/1990 | Tomaschke | |
| 4,963,165 A * | 10/1990 | Blume et al. | 95/46 |
| 5,044,166 A * | 9/1991 | Wijmans et al. | 62/85 |
| 5,075,011 A * | 12/1991 | Waite | 210/644 |
| 5,082,471 A * | 1/1992 | Athayde et al. | 95/51 |
| 5,118,424 A * | 6/1992 | McRae | 210/653 |
| 5,147,553 A * | 9/1992 | Waite | 210/654 |
| 5,152,901 A * | 10/1992 | Hodgdon | 210/654 |
| 5,205,843 A * | 4/1993 | Kaschemekat et al. | 95/39 |
| 5,296,144 A * | 3/1994 | Sternina et al. | 210/490 |
| 5,374,300 A * | 12/1994 | Kaschemekat et al. | 95/39 |
| 5,698,105 A | 12/1997 | Colquhoun et al. | |
| 5,989,426 A | 11/1999 | Hirose et al. | |
| 6,026,968 A | 2/2000 | Hachisuka et al. | |
| 6,177,011 B1 | 1/2001 | Hachisuka et al. | |
| 6,368,382 B1 * | 4/2002 | Chiou | 95/49 |
| 6,413,425 B1 | 7/2002 | Hachisuka et al. | |
| 6,913,694 B2 * | 7/2005 | Koo et al. | 210/500.38 |
| 7,018,539 B2 * | 3/2006 | Mairal et al. | 210/651 |
| 2003/0121844 A1 | 7/2003 | Koo et al. | |

FOREIGN PATENT DOCUMENTS

DE  4237604  5/1994

OTHER PUBLICATIONS

S. Nunes et al., "Dense Hydrophilic Composite Membranes for Ultrafiltration," J. Membrane Science, 1995, p. 51-56, vol. 106, Elsevier Pub., Amsterdam.

(Continued)

*Primary Examiner*—Ana M Fortuna
(74) *Attorney, Agent, or Firm*—J. Farrant

(57) ABSTRACT

A reverse osmosis membrane, and methods for making and using the membrane. The membrane has a continuous, defect-free, non-porous, hydrophilic coating that reduces the susceptibility to fouling.

20 Claims, 18 Drawing Sheets

OTHER PUBLICATIONS

K. Ebert et al., "Solvent-Resistant Nanofiltration Membranes in Edible Oil Processing," Membrane Technology, 1999, p. 5-8, vol. 107.

R. Peterson, "Composite Reverse Osmosis and Nanofiltration Membranes," J. Membrane Science, 1993, p. 81, 89-132, vol. 83, Elsevier Pub., Amsterdam.

* cited by examiner

REVERSE OSMOSIS MEMBRANE AND PROCESS

This invention was made in part with Government support under SBIR award number 68-D-02-032 awarded by the Environmental Protection Agency, and in part under contract number N00014-02-C-0231, awarded by the Department of the Navy, Office of Naval Research. The Government has certain rights in this invention.

FIELD OF THE INVENTION

The invention relates to reverse osmosis membranes and processes. More particularly, the invention relates to reverse osmosis membranes having a hydrophilic coating that provides improved fouling resistance.

BACKGROUND OF THE INVENTION

Reverse osmosis is most commonly used to treat water containing dissolved salts. Treatment is carried out by flowing a water stream across the feed side of a membrane. Pressure in excess of the osmotic pressure of the feed solution is applied on the feed side, and under this pressure driving force, water molecules pass through the membrane preferentially. The treated water, containing a much lower concentration of salt than the feed water, is withdrawn from the permeate side. Dissolved salts, organic compounds, colloids, microorganisms and any other matter suspended in the water are retained on the feed side.

Reverse osmosis membranes may be made by a number of membrane preparation techniques. The first commercial reverse osmosis membranes were asymmetric cellulose acetate membranes made by the Loeb-Sourirajan phase separation or phase inversion process. These membranes have lower flux and rejection than other high-performance modem membranes, but have maintained a fraction of the market because they are easy to make, mechanically tough, and relatively resistant to degradation by chlorine and other chemicals.

However, almost all reverse osmosis membranes are now made by interfacial polymerization. In this method, an aqueous solution of a reactive monomer, such as a diamine, is deposited in the pores of a microporous support membrane, typically a polysulfone ultrafiltration membrane. The amine-loaded support is then immersed in a water-immiscible solvent solution containing a reactant, such as a triacid chloride in hexane. The amine and acid chloride react at the interface of the two immiscible solutions to form a densely crosslinked, extremely thin membrane layer. Interfacially polymerized RO composite membranes typically contain either an anionic or a cationic charge.

Current commercial RO membranes made by interfacial polymerization have sodium chloride rejections of 99+% and water fluxes greater than 35 $L/m^2 \cdot h$ at a feed pressure of 800 psig. Recent studies have shown that these membranes also exhibit rejections of 99+% for pesticides and organic micropollutants, such as chlorophenols.

The best RO membranes for seawater desalination are highly crosslinked aromatic polyamide thin-film composite membranes made by the interfacial polymerization process. These composite membranes consist of three layers: (i) a microporous support; (ii) an ultrathin selective polymer layer; and (iii) a thin, porous surface layer.

About half of the reverse osmosis systems currently installed are used to desalinate brackish water or seawater. Another 40% produce ultrapure water for the electronics, pharmaceutical, and power generation industries. The remainder are used in small niche applications such as pollution control and food processing. One reason that reverse osmosis is not applied more widely, such as to treat industrial wastewater, is the propensity of the membranes, especially those made by interfacial polymerization, to foul.

Fouling occurs when contaminants such as charged solutes, oils, bacteria, colloidal materials of various types, and suspended particulates become trapped on the surface or in the pores of the membrane. Membrane fouling is an issue for all reverse osmosis operations, and systems are usually designed to include one or more pretreatment steps upstream of the reverse osmosis units. These treatments frequently involve combinations of physical processes, such as filtration, to remove particulates, bacteria and oils, and chemical treatments to sterilize the feed water, control pH and the like.

Despite careful pretreatment, regular cleaning is also required in many cases to handle fouling that still occurs.

Typical surface structures of aromatic polyamide RO membranes made by interfacial polymerization are shown in FIGS. 4 and 6. The surface of the membrane is surprisingly rough and porous. The membrane has a "ridge-and-valley" structure with a surface pore size in the range of 0.1-0.5 micron. This membrane fouls very easily as solutes and particulates pass through the surface pores into the internal membrane structure. Additional fouling results from the interaction of the charged membrane material with charged colloids and surfactant.

Attempts have been made to modify RO membranes in different ways to improve their properties.

U.S. Pat. No. 5,989,426 discloses applying a positively-charged coating to an otherwise negatively charged polyamide membrane to improve rejection of cations by the membrane.

U.S. Pat. No. 6,026,968 discloses reverse osmosis membranes to which a hydrophilic coating containing a sulfonic acid group is added to improve anion rejection as well as chlorine resistance.

U.S. Pat. No. 6,177,011 describes reverse osmosis membranes having electrically neutral coatings intended to reduce fouling of the surface by charged particles.

U.S. Pat. No. 6,413,425 describes reverse osmosis membranes similar to those of U.S. Pat. No. 6,177,011 above, but specifically having a polyvinyl alcohol (PVA) coating. The coating reduces the surface roughness in a quantified manner.

U.S. Pat. No. 5,698,105 also describes reverse osmosis membranes with a PVA coating. The coating improves the salt rejection of the membrane.

U.S. Published Patent Application 2003/0121844 describes reverse osmosis membranes having a coating of a crosslinked epoxy compound. The coating was found to reduce fouling by dried milk or surfactant.

Polyamide-polyether block copolymers have been reported to be useful as selective layers in gas separation and ultrafiltration membranes, as in U.S. Pat. No. 4,963,165; German patent number DE 4237604; an article by K. Ebert et al., "Solvent resistant nanofiltration membranes in edible oil processing," (*Membrane Technology*, No. 107, p. 5-8, 1999); and an article by S. Nunes et al., "Dense hydrophilic composite membranes for ultrafiltration," (*J. Membrane Science*, Vol. 106, p. 49-56, 1995).

Fouling continues to be a serious problem for reverse osmosis membranes, and one that hampers the use of reverse osmosis except on feed streams that are very clean or have been made so by rigorous pretreatment.

There remains a need for intrinsically less fouling reverse osmosis membranes. If such a need could be filled, wider applications of reverse osmosis treatment, such as to industrial wastewaters of many types, or for military or naval use, would be possible.

SUMMARY OF THE INVENTION

The invention is a coated reverse osmosis membrane, and methods for making and using the membrane.

The membrane is coated with a hydrophilic coating on the side that will be exposed to the feed solution. This coating is prepared from a polymer that is water swellable but water insoluble. Because the polymer is water insoluble, crosslinking is not required after the coating has been deposited. Preferably the coating either is formed from a rubbery polymer, or at least from a polymer having a rubbery polymer segment within the polymer structure. Further, the polymer should preferably contain no free charged groups and the coating should present a surface to the feed solution that is electrically neutral overall.

The coating forms an essentially continuous, defect-free, non-porous layer over the surface of the underlying membrane. By essentially continuous, defect-free, non-porous we mean that the coating sufficiently occludes the underlying membrane that it imparts certain changed gas separation properties to the membrane, as explained in more detail below.

The membranes of the invention may be made by coating existing commercial membranes, or may be prepared by first carrying out any of the known techniques for making reverse osmosis membranes, then coating the resulting membrane.

The coating is not relied upon to impart reverse osmosis separation properties, and in general, the rejection properties of the coated membranes are similar to those of an uncoated membrane of the same structure and composition. For certain solutes, the coating may result in a slightly higher rejection, but the improvement is typically minor, such as less than 10% and more usually less than 5%. In some cases, the rejection may lowered by coating, but again, the change is typically very minor.

The coating typically results in a membrane that exhibits a lower initial flux than the initial flux of an uncoated membrane of the same structure and composition, if the coated and uncoated membranes are challenged with the same feed solution.

The coated membranes are much less susceptible to fouling than their uncoated equivalents when challenged with common contaminants such as oils, surfactants, other organic compounds and heavy metals. For example, flux decline over a period of days or weeks for the coated membranes may be half or less than would occur with uncoated membranes of the same structure and composition. Internal fouling, caused by material trapped inside membrane pores or surface crevices, is believed to be essentially completely eliminated by the continuous, defect-free, non-porous coating.

The invention further includes methods of making the coated membrane and reverse osmosis processes using the coated membrane. In its most basic form, the process of the invention includes the following steps:

(a) providing a membrane separation device having a feed side and a permeate side and containing a coated reverse osmosis membrane as described above;

(b) passing a water stream containing a contaminant removable by reverse osmosis across the feed side under reverse osmosis conditions;

(c) removing from the feed side a contaminant-enriched water stream;

(d) removing from the permeate side a treated water stream depleted in the contaminant.

The process may include any additional steps as required, including, but not limited to, treatment of the feed water upstream of the reverse osmosis step itself, follow-on treatment of the permeate water or the retained concentrate, and more than one reverse osmosis step.

Contaminants that may be removed by the process of the invention include dissolved inorganic salts, dissolved organic materials, emulsions, colloids and suspended materials made up of fouling matter including oils, grease, bacteria and particulates.

In general, the tolerance of the processes of the invention for handling "dirty" streams, that is, streams that contain large solutes and undissolved matter, is higher than that of prior art processes. In some circumstances, this means that a lesser degree of pretreatment is needed, or the process can be operated for a longer time before membrane cleaning is needed, or the process may be used to treat a stream that was previously untreatable, either on technical or economic grounds, by reverse osmosis.

The invention is expected to expand the field of applications for reverse osmosis. Areas to which the process may be applied, include, but are not limited to: brackish water desalination; seawater desalination; preparation of ultrapure water; treatment of wastewater from various sources, including municipal, industrial and naval operations; treatment of littoral waters; and nanofiltration.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

All percentages herein are by weight unless otherwise stated.

Figure 1:
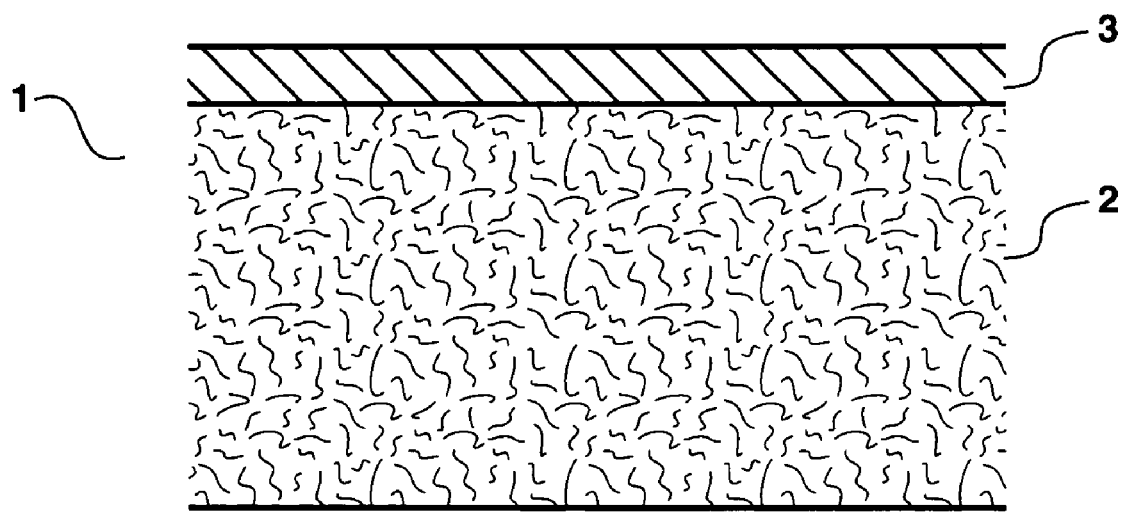
FIG. 1 is a schematic drawing showing a cross-section of a coated reverse osmosis membrane.

In a first aspect, the invention is a coated reverse osmosis membrane, indicated generally as 1 in FIG. 1. The membrane is a composite structure comprising at least two parts: a reverse osmosis membrane, 2, and a coating layer, 3.

The reverse osmosis membrane may be made of any material, and may take any form, so long as it is capable of performing reverse osmosis, that it, it is capable, under a suitable applied pressure, of preferentially permeating water and rejecting dissolved salts. As was touched on in the background discussion above, different types of reverse osmosis membranes are known, most being either integral asymmetric membranes or thin-film composite membranes.

In both of these types of membrane, the selective layer takes the form of a thin, relatively dense and very finely porous layer that overlies a more openly microporous or porous substructure. Thus, the reverse osmosis membrane is itself a multilayer structure.

In addition to the selective layer and the support layer, any number of other layers may be present, such as a backing web onto which the support layer is cast, intermediate layers between the support and selective layers, and top layers (including those resulting from chemically modifying the surface of the selective layer) added to change the charge characteristics of the surface of the selective layer, improve the rejection properties, reduce fouling and so on.

Thus, in the present context, the term reverse osmosis membrane includes all the layers of the coated reverse osmosis membrane, except the coating layer that meets the defining attributes set forth herein.

The preferred reverse osmosis membrane is a thin-film composite membrane made by interfacial polymerization. As mentioned above, reverse osmosis membranes made by interfacial polymerization include at least three layers: (i) a microporous support; (ii) a very thin selective polymer layer; and (iii) a thin but rough porous surface layer.

Figure 2:
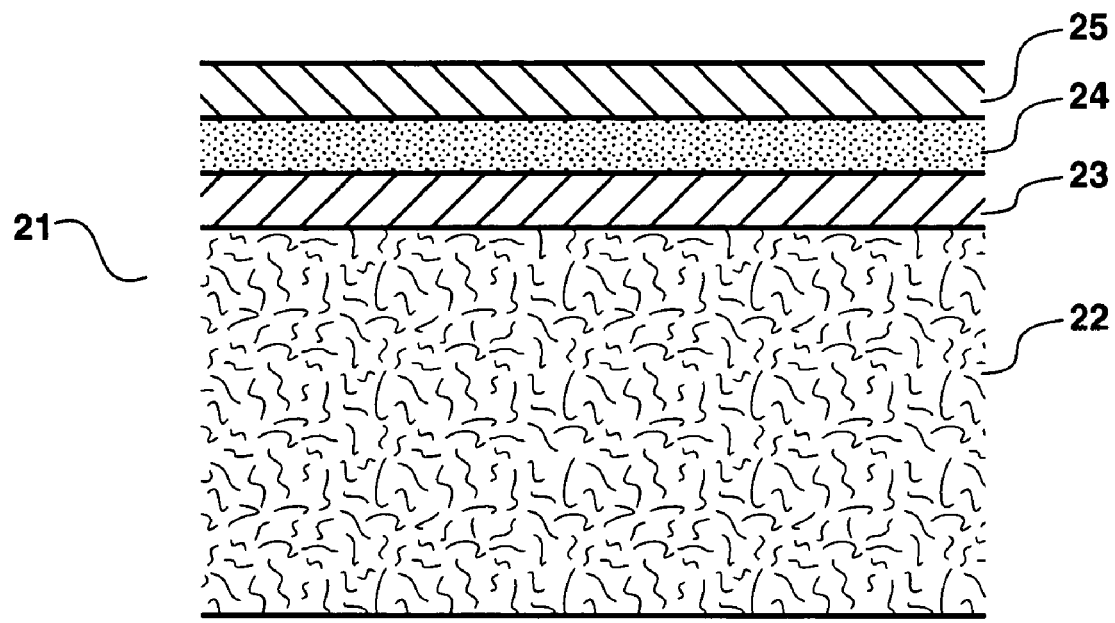
FIG. 2 is a schematic drawing showing a cross-section of a coated reverse osmosis membrane having a reverse osmosis membrane that includes a support layer, a selective layer prepared by interfacial polymerization and a porous surface layer.

FIG. 2 is a schematic drawing showing a coated reverse osmosis membrane of this type, indicated generally as 21. Coating layer 25, corresponds to layer 3 in FIG. 1. Three layers of the underlying reverse osmosis membrane are shown: the microporous support layer, 22, the interfacially polymerized selective layer, 23, and the rough surface layer, 24.

The interfacially polymerized selective layer may be made by any of the known techniques, such as are described below. Preferably the selective layer is a crosslinked polyamide.

Many good reverse osmosis membranes, designed to handle a variety of applications and to provide a variety of performance characteristics, are available commercially. Examples include the ESPA, LFC and SWC product lines from Hydranautics, the Filmtec™ BW30, SW30 and NF90 product lines from Dow, the DS-3 and OSMO series membranes from GE Water Technologies, the TFC®, ROGA® and MAGNUM® lines from Koch Membrane Systems, and the SC and SU grades from Toray. Any of these, or any other commercial reverse osmosis membrane, may be used as the reverse osmosis membrane.

The coating layer coats the reverse osmosis membrane on the side that will be exposed to the feed solution when the membrane is in use. This coating comprises a hydrophilic polymer that is water swellable but water insoluble. By water insoluble, we mean that the polymer will not dissolve to any meaningful concentration in liquid water at any temperature. By meaningful concentration, we mean a concentration above the tens of ppm level.

By water swellable, we mean that on immersion in liquid water for a prolonged period, the weight of a polymer sample increases by a measurable amount, such as 10 wt % or more. Preferably the water sorption should be substantially higher than this, so that the polymer swells by a weight increase of 40% or more, and more preferably by 70% or more, and most preferably by at least 100%.

A particular advantage of using a water-insoluble polymer for the coating is that crosslinking is not required after the coating has been deposited to render it stable. This simplifies the membrane preparation technique.

Preferably, the coating is formed either from a rubbery polymer, or at least from a polymer having a rubbery polymer segment within the polymer structure. By a rubbery polymer, we mean a polymer that is above its glass transition temperature under the conditions at which the membrane is likely to be operated. Thus, any polymer that has a glass transition temperature below 0° C. meets this definition, and in general, any polymer that has a glass transition temperature below about 10° C. meets this definition.

Polymers that are rubbery or contain rubbery segments sufficient to meet the above definition include epichlorohydrin polymers; epichlorohydrin copolymers, such as epichlorohydrin-ethylene oxide copolymers; polyethylene oxide polymers and copolymers; allyl glycidyl ether polymers; polyurethane; and other copolymers having relatively high proportions of polyether blocks, by which we mean preferably 50% polyether or higher.

Most preferably, the polymer used for the coating layer is a polyamide-polyether block copolymer. Such polymers are available commercially under the name Pebax® from ATOFINA Chemicals, Philadelphia, Pa. Pebax polymers have the general formula

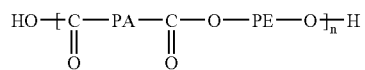

where PA is a polyamide segment, PE is a polyether segment and n is a positive integer. The polyamide blocks provide mechanical strength; the polyether blocks allow high water permeability.

These polymers are available in a range of grades having different proportions of polyamide and polyether. Preferred grades in terms of water sorption capabilities are grade 1074, which has

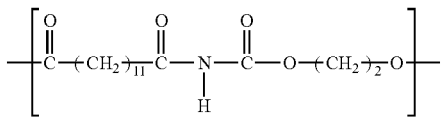

and grade 1657 which has the following structure:

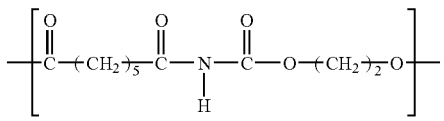

For preference, the coating should present a surface to the feed solution that is electrically neutral overall, which means that the polymer used for the coating layer should be electrically neutral. More specifically, polymers having ion-exchange properties or containing free charged groups, such as the sulfonated polymers described in U.S. Pat. No. 6,026,968, should be avoided.

A feature of the coating is that it should form an essentially continuous, defect-free, non-porous layer over the surface of the underlying membrane. By essentially continuous, defect-free, non-porous we mean that the coating sufficiently occludes the underlying membrane that it imparts certain changed gas separation properties to the membrane.

Without wishing to be bound by theory, the properties of the coating can be understood with reference to gas separation principles.

Gas permeation through a polymeric membrane may take place in several ways. If the membrane is porous and the pores are relatively large—from 0.1 to 10 micron—gases permeate the membrane by convective flow, and no separation occurs.

If the pores are smaller than about 0.1 micron, then the pore diameter is as small or smaller than the mean free path of the gas molecules. (At atmospheric pressure the mean free path of common gases is in the range 500 to 2,000 Å.) Transport through such pores is governed by Knudsen diffusion, and the transport rate of a gas is inversely proportional to the square root of its molecular weight. Unless the gases are of very different molecular weight, therefore, their transport rates are similar and the membrane exhibits low selectivity in favor of one gas over another.

When the pore diameter decreases to the 5 to 10 Å range, the pores begin to separate gases by a molecular sieving effect, and high selectivity is possible in principle. Ultimately, if the membrane is a dense polymer layer without permanent pores, the free-volume elements in the membrane are tiny spaces between polymer chains caused by thermal motion of the polymer molecules. These volume elements appear and disappear on about the same time scale as the motions of the permeants traversing the membrane.

The transport mechanism in such dense, non-porous membranes is solution-diffusion. Permeant gases dissolve in the polymer material of the membrane and diffuse through the membrane down a concentration gradient. The permeants are separated because of the differences in the solubilities of the materials in the membrane and the differences in the rates at which the materials diffuse through the membrane.

All current commercial polymeric gas separation membranes are dense, non-porous membranes. Gas separation membranes are far more sensitive to minor defects, such as pinholes in the selective membrane layer, than membranes used in reverse osmosis. Even a single small membrane defect can dramatically decrease the selectivity, especially if the membrane has high selectivity. For example, if a polymeric membrane has a selectivity of 100 for a gas pair, a small defect (one that allows as little as 1% of the permeating gas to pass unseparated) can cut the membrane selectivity in half.

Generation of a few defects is very difficult to avoid during membrane preparation and module formation. One way to handle such defects is to coat the membranes with a thin layer of a polymer that has very high permeability, but low selectivity, compared with the underlying gas separation membrane. The coating does not significantly change the selectivity or flux through the defect-free portions of the underlying gas separation membrane, but plugs the defects, thereby eliminating convective flow. As a result, the membrane now exhibits a selectivity for the gas pair that is close to the selectivity that would have been obtained if the membrane had been perfect.

The relevance of the above discussion to the membranes of the invention is that the gas separation properties of the coated membrane are a test of how well the coating seals the underlying membrane, that is, they are a test of the continuous, defect-free nature of the coating layer.

A reverse osmosis membrane tested for its gas separation properties typically exhibits separation characteristics consistent with Knudsen diffusion. However, if the coating covers the entirety of the operating surface of the reverse osmosis membrane, and does so without discontinuities, holes or cracks, the coating will seal the underlying membrane as described above and the coated membrane will behave as a solution/diffusion gas separation membrane. That is, it will exhibit a selectivity in favor of one gas over another that represents the solution/diffusion selectivity through the polymer that forms the selective layer of the underlying membrane.

On the other hand, if even very small uncoated holes or cracks are present, the underlying reverse osmosis membrane will be exposed and will continue to permit relatively unselective Knudsen gas flow.

A membrane permeating gases principally by Knudsen diffusion will exhibit a selectivity in favor of oxygen over nitrogen of about 0.9; that is, it will exhibit a slight selectivity in favor of nitrogen over oxygen. All polymeric membranes separating gases by solution/diffusion through the polymer exhibit a selectivity in the other direction, that is, in favor of oxygen over nitrogen. For an average polyamide, this selectivity is generally between about 2 and 4.

Likewise, a membrane permeating gases principally by Knudsen diffusion will exhibit a selectivity in favor of hydrogen over nitrogen of about 3.7, whereas a polyamide membrane separating gases by solution/diffusion has a typical hydrogen/nitrogen selectivity, depending on the specific polyamide, of 20, 50, 100 or more.

These big increases in gas separation selectivity provide a quantitative standard for the coating layer. We regard the coating layer as meeting our definition of a continuous, defect-free, non-porous layer if the coating raises the overall membrane gas selectivity to be on the order of the solution/diffusion selectivity (consistent with whatever type of underlying polymer is present).

To clarify this definition, if the underlying selective layer of the reverse osmosis membrane is a type of polyamide, as will mostly be the case, a successfully coated membrane will exhibit an oxygen/nitrogen selectivity of at least about 2, or a hydrogen/nitrogen selectivity of at least about 20.

Expressed in another way, the measure of a successful, continuous, defect-free, non-porous coating is that it at least doubles the oxygen/nitrogen selectivity of the membrane, or that it raises the hydrogen/nitrogen selectivity of the membrane by at least an order of magnitude.

The substantial change to the reverse osmosis membrane brought about by addition of the continuous coating layer can be seen when the membrane is examined under an electron microscope. Scanning electron micrographs of two membranes in the uncoated and coated state are provided as FIGS. 4 through 7.

Figure 4:
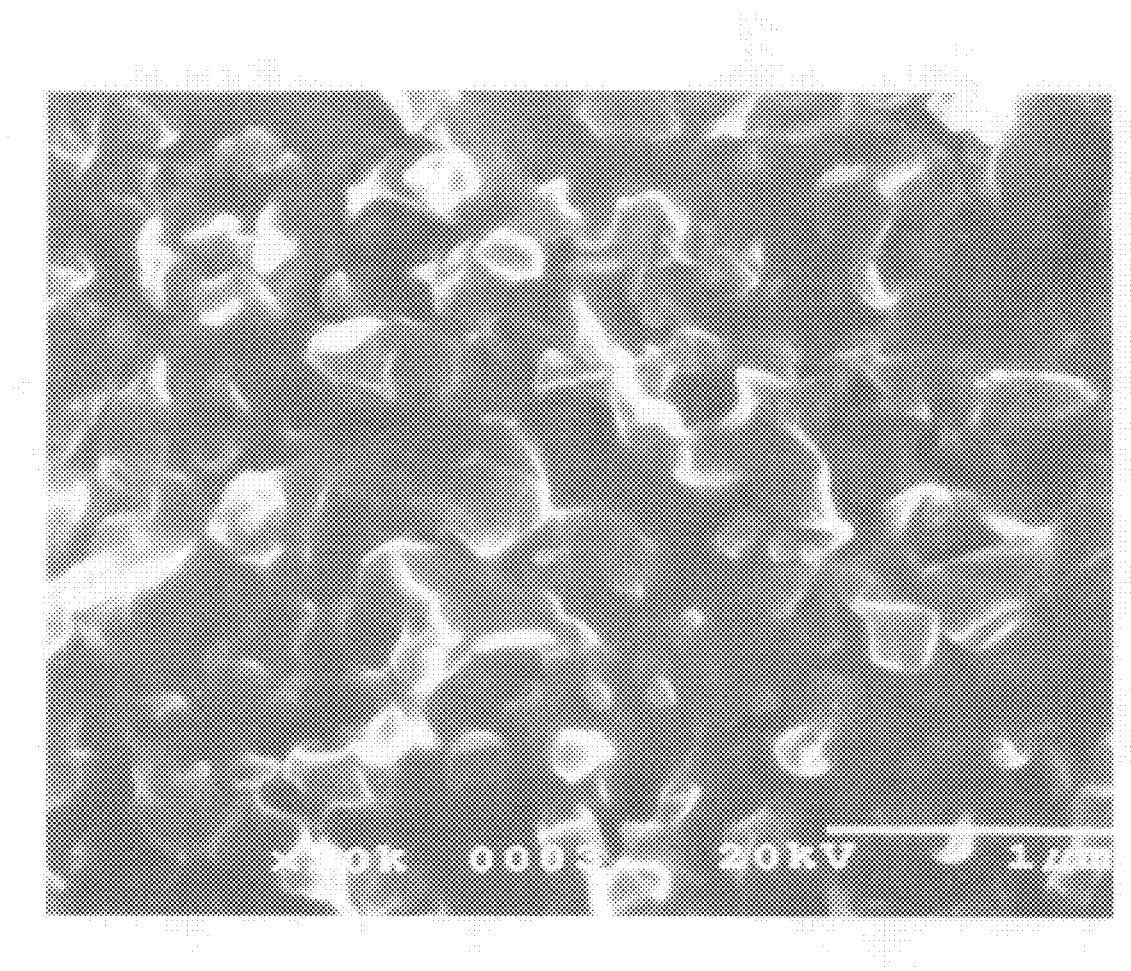
FIG. 4 is a scanning electron micrograph (SEM) of the surface of a commercial reverse osmosis membrane (LFC1).

FIG. 4 is a scanning electron micrograph (SEM) of the surface of a commercial reverse osmosis membrane sold by Hydranautics under the name LFC1. The membrane is a thin-film composite crosslinked polyamide membrane made by interfacial polymerization. The product line identifier LFC stands for low fouling composite, and this grade of membrane is offered for treatment of difficult feedwaters, including municipal wastewater, surface water and industrial wastewater. The membrane is believed to be made according to the teachings of U.S. Pat. Nos. 6,177,011 and 6,413,425 and to be treated with a polyvinyl alcohol (PVA) coating according to those patents.

As can be seen in FIG. 4, however, the operating surface of the membrane exhibits a rough, strongly ridged appearance, with well defined peaks (light areas) and deep troughs (dark areas). The distance between ridges is typically a few tenths of a micron.

Figure 5:
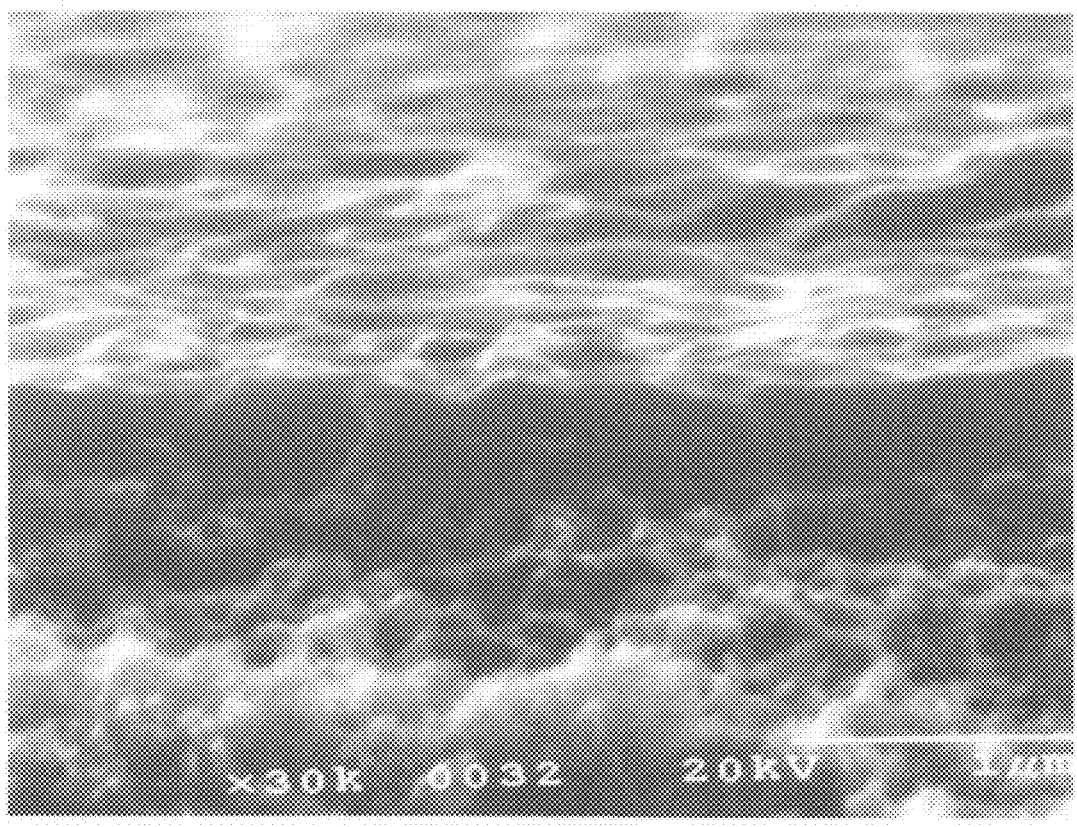
FIG. 5 is a scanning electron micrograph (SEM) of the surface and edge of the membrane of FIG. 4 after coating.

FIG. 5 is an SEM taken at an angle to show the surface and edge of the LFC1 membrane after coating with a polyamide-polyether block copolymer layer according to the present teachings. The upper portion of the SEM shows the coated surface of the membrane; the lower portion shows the edge of the membrane in partial cross section, so that the underlying support membrane is visible.

As can be seen, the coating forms an unbroken layer and the surface of the coating is very smooth compared with the uncoated surface of FIG. 4. The coating has completely occluded the surface pores of the LFC1 membrane. No pores are present in the coating and the undulations of the surface are very shallow. This coating meets the requirements of the invention for a continuous, defect-free non-porous surface.

Figure 6:
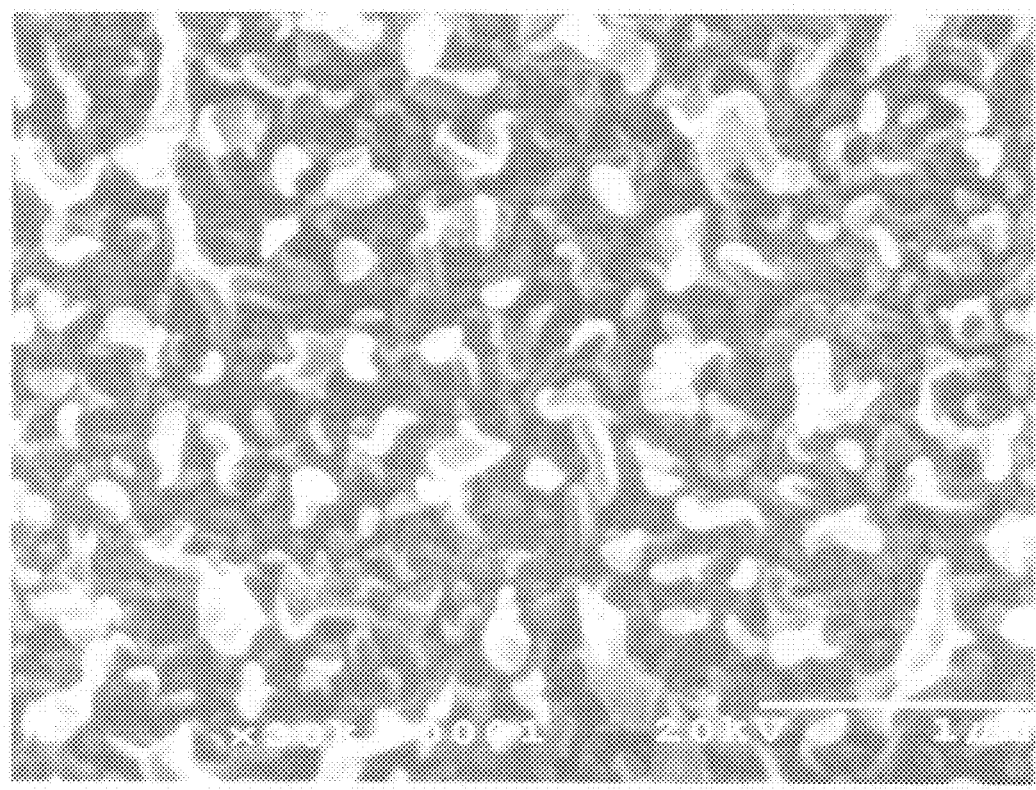
FIG. 6 is a scanning electron micrograph (SEM) of the surface of a commercial reverse osmosis membrane (SWC1).

FIG. 6 is an SEM of another grade of Hydranautics membrane, the SWC1, designed for seawater desalination. This is also a crosslinked polyamide interfacial composite membrane. As can be seen, the surface again shows a pronounced ridge structure, with many crevices or pores.

Figure 7:
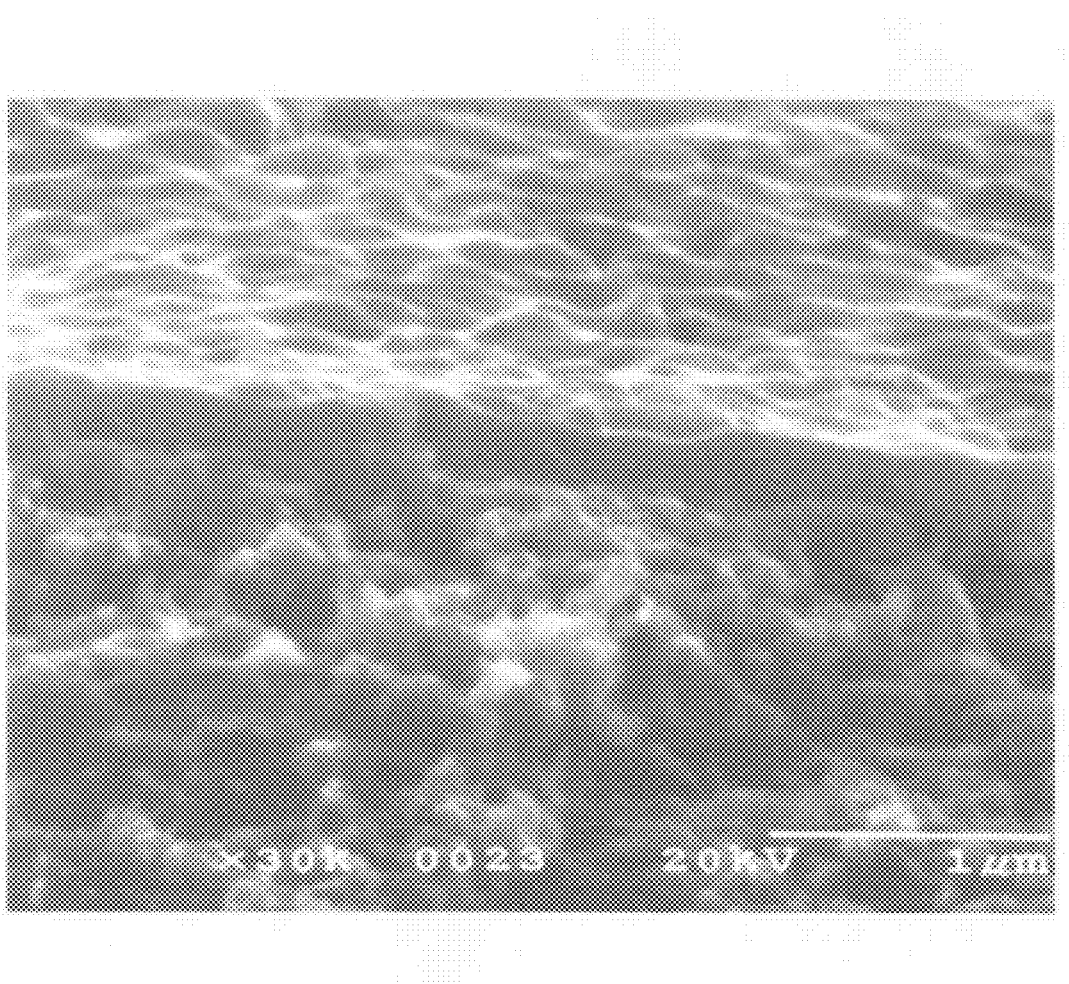
FIG. 7 is a scanning electron micrograph (SEM) of of the surface and edge of the membrane of FIG. 6 after coating.

FIG. 7 shows the surface and edge of the SWC1 membrane after coating with a polyamide-polyether block copolymer layer according to the present teachings. As with FIG. 5, the upper portion of the SEM shows the coated surface of the membrane; the lower portion shows the edge of the membrane in partial cross section, so that the underlying support membrane is visible.

The coated area shown in FIG. 7 is very smooth compared with the uncoated surface shown in FIG. 6. No pores or deep crevices are visible, and the coating fully occludes the underlying membrane. This coating again meets the requirements of the invention for a continuous, defect-free non-porous surface.

The coated reverse osmosis membrane exhibits a number of distinctive properties, when compared under like conditions with an otherwise identical uncoated membrane.

First, the coating is not relied upon to impart reverse osmosis separation properties, and in general, the rejection properties of the coated membranes are similar to those of an uncoated membrane of the same structure and composition. That is, the coating usually does not change the rejection of the membrane by more than 10% in either direction. For certain solutes, the coating may result in a slightly higher rejection, but the improvement is typically minor, such as no more than about 5%. In some cases, the rejection may be lower after coating, but again, the change is typically only a few percent, such as 5% or less. Frequently, the rejection stays within ±1% of its original value after coating.

The coating increases the thickness of the membrane overall, so even if the polymer used for the coating has very high intrinsic water permeability, the coated membrane typically exhibits a lower initial water flux than the initial water flux of an uncoated membrane of the same structure and composition. The initial water flux is the flux measured with a clean, previously unused membrane as originally supplied by the commercial manufacturer or as prepared according to the teachings herein.

For example, the initial water flux of a commercial high-flux reverse osmosis membrane, when tested with pure water, and at the same temperature and pressure, may be 150 L/m$^2$·h before coating and may drop after coating to 120 L/m$^2$·h, when measured at the same temperature and pressure. As another example, the initial water flux of a commercial high-rejection reverse osmosis membrane, when tested with a salt solution containing 1,500 ppm sodium chloride, may be 80 L/m$^2$·h before coating and 55 L/m$^2$·h after coating, both measurements being made at the same temperature and pressure.

During prolonged operation, however, the coated membranes of the invention are much less susceptible to fouling than their uncoated equivalents. That is, when they are exposed to common contaminants such as oils, surfactants, other organic compounds and heavy metals, the coated membranes manifest a much slower rate of flux decline than the uncoated membranes.

It will be appreciated by those of skill in the art that fouling by particulates, oils and the like is highly dependent on the feed that is to be treated and the operating conditions of the process, and that a generalized quantification of the improved fouling resistance of the membranes is very difficult to make.

In the reverse osmosis industry, a commonly used predictor of the likelihood of a particular feed water to produce fouling by silt is the silt density index (SDI) of the feed water. The SDI, an empirical measurement (ASTM Standard D-4189-82, 1987), is the time required to filter a fixed volume of water through a standard 0.45-micron pore size microfiltration membrane. Suspended material in the feed water that plugs the microfilter increases the sample filtration time, giving a higher SDI.

When using prior art membranes, an SDI of less than 1 suggests that operation for a year or more without significant fouling should be possible. An SDI of less than 3 suggests that the system can run for a month without significant fouling. An SDI of 3 to 5 suggests that fouling is likely to occur within weeks to days, and an SDI of more than 5 suggests that fouling that reduces flux to an unacceptable level is likely to occur within minutes.

As a guideline, when challenged with a feed having an SDI of 3, 4, or 5, the membranes of the invention can typically preserve a flux that is at least 50% of the initial flux value for a period that is at least twice as long as an equivalent uncoated membrane.

As just one average example, when exposed to a feed having an SDI of 3.5, the water flux of an uncoated seawater-grade reverse osmosis membrane may drop to 50% of its initial value within a day, and to 10% of its initial value over a period of a week. The corresponding water flux of an identical coated membrane may drop only to 80% of its initial value in a day and only to 50% of its initial value over a week.

In this way, there comes a crossover point at which the water flux of the coated membranes matches the water flux of the uncoated equivalent membrane, and thereafter, the water flux of the coated membrane increasingly exceeds that of the uncoated membrane. Depending on the foulant concerned and the specifics of operation, this crossover point may occur within a matter of hours or days.

To make the membranes of the invention, a reverse osmosis membrane must be coated on its feed side with a coating that meets the criteria described above.

The preparation of reverse osmosis membranes is well documented in the literature, and the reverse osmosis membrane to be coated may be made by any of the known techniques, including interfacial polymerization and phase inversion.

The interfacial polymerization method is described in detail in, for example, U.S. Pat. No. 4,277,344, to Cadotte, and U.S. Pat. Nos. 4,872,984 and 4,948,507, both to Tomaschke, which three patents are incorporated herein by reference in their entirety.

For further information, a review of many process details is given in an article by R. J. Petersen entitled "Composite Reverse Osmosis Membranes and Nanofiltration Membranes", *Journal of Membrane Science*, 83, 89-132 (1993).

In brief, the polymerization reaction takes place at the surface of a microporous support and is typically carried out between a polyfunctional amine and a polyfunctional acid halide.

The microporous support is preferably of an asymmetric structure, such as could be used for ultrafiltration, and the interfacial reaction is carried out on the more finely porous side. A commercial polysulfone ultrafiltration membrane may be used as a preferred microporous support, for example.

The amine is preferably, but not necessarily, a monomeric amine with two or three reactive amine groups. Preferred amines are aromatic or other types of cyclic amines. A highly preferred amine is phenylene diamine, which is used by several commercial manufacturers. An amine solution, preferably aqueous, and typically containing a few percent of the polyfunctional amine, such as 5% or less, is prepared. In addition to the amine reagent, the solution may contain other additives, for example, wetting agents or reaction promoters, as required by the specific reaction process to be used. The aqueous solution is applied to the microporous support, usually, but not necessarily by dip-coating, by running a length of microporous support membrane through a coating bath containing the aqueous amine solution.

After excess solution has been removed if necessary, such as by draining or rolling, the membrane is brought into contact with the other reagent, a polyfunctional acid halide. Like the amine reagent, the halide reagent is preferably an aromatic molecule having multiple active halide (usually chloride) groups. A highly preferred chloride is trimesoyl chloride. To avoid mixing the reagent solutions, the acid chloride is preferably dissolved in a non-polar, organic solvent, such as hexane or another paraffin solvent. This solution may also contain additives as appropriate. The solution concentration is again typically a few percent chloride.

A simple way to make contact is to pass the membrane through a second bath containing the organic chloride solution. Alternatively, the acid chloride may be applied as a vapor by spraying. Once brought into contact, the amine and acid chloride react within a second or less at the solution interface to form a crosslinked polyamide layer. The membrane is withdrawn from the bath, and is finished, such as by a series of rinsing and air- or oven-drying steps.

This technique results in a densely crosslinked, extremely thin selective layer. This layer is typically no more than about 1 micron thick, and often much thinner, such as less than 0.5 micron or less than 0.1 micron thick. Above this layer is a rougher, more porous surface layer, as described above and seen in FIGS. 4 and 6.

The process may include other optional steps as desired, such as to apply a protective layer or layers to the interfacially polymerized membrane or to modify the properties.

The phase separation or phase inversion method is well known to membrane makers and is described in detail, for example, in U.S. Pat. Nos. 3,133,132 and 3,133,137 to Loeb, and U.S. Pat. No. 4,305,824 to Uemura et al., which three patents are incorporated herein by reference in their entirety.

Integral asymmetric reverse osmosis membranes are prepared by phase separation of a polymer solution according to the techniques first developed by Loeb and Sourirajan. In brief, a polymer casting solution or dope is prepared and is caused to precipitate into two phases: a solid phase that forms the polymer matrix of the membrane, and a liquid phase that forms the membrane pores. The polymer is preferably cellulose acetate or another cellulose derivative, or a blend of cellulose acetate with another acetyl polymer. The solvent system is typically a mixture of solvents and non-solvents, such as dioxane/acetone/methanol. Other additives to assist in pore formation or otherwise modify the membrane structure and properties may also be included.

The solution is cast onto a continuously moving web. The cast film is then precipitated by immersion of the web in a water bath. The water precipitates the top surface of the cast film rapidly, forming the selective skin layer. This skin slows entry of water into the underlying polymer solution, which precipitates much more slowly and forms a more open substructure. After membrane formation is complete, the membrane is washed thoroughly to remove residual solvent.

The resulting membrane, although formed from the same polymer(s) throughout, has a markedly asymmetric structure, in which the relatively dense, very finely porous skin layer overlies a more openly microporous or porous substructure. Thus, the porosity and pore size change in different layers of the membrane. The denser skin layer, which is usually one micron or less thick, gives rise to the separation capability.

Many good quality reverse osmosis membranes of both the thin film composite and integral asymmetric type are available from commercial suppliers, including Hydranautics, Dow, Osmonics, Koch and Toray. As an alternative to making the reverse osmosis membrane oneself, it may be purchased from such a supplier.

Examples of commercially available membranes suitable for use in the invention include, but are not limited to, the ESPA, LFC and SWC product lines from Hydranautics, the Filmtec™ BW30, SW30 and NF90 product lines from Dow, the DS-3 and OSMO series membranes from GE Water Technologies, the TFC®, ROGA® and MAGNUM® lines from Koch Membrane Systems, and the SC and SU grades from Toray.

It is preferred that the reverse osmosis membrane is a thin film composite membrane made by interfacial polymerization. If commercially purchased reverse osmosis membranes are used, Hydranautics membranes are preferred.

The coated reverse osmosis membrane is made by coating the reverse osmosis membrane on the feed side, that is, the side that will exposed to the feed solution in use, with the hydrophilic coating. This can be done by any convenient technique, but is preferably done by solution coating, following a dip-coating method as is well known in the art and described in general terms above. A thin film of the polymer solution is deposited on the reverse osmosis membrane surface by immersing and then slowly withdrawing the membrane from the solution. When the solvent evaporates, a thin polymer layer is left behind.

Figure 3:
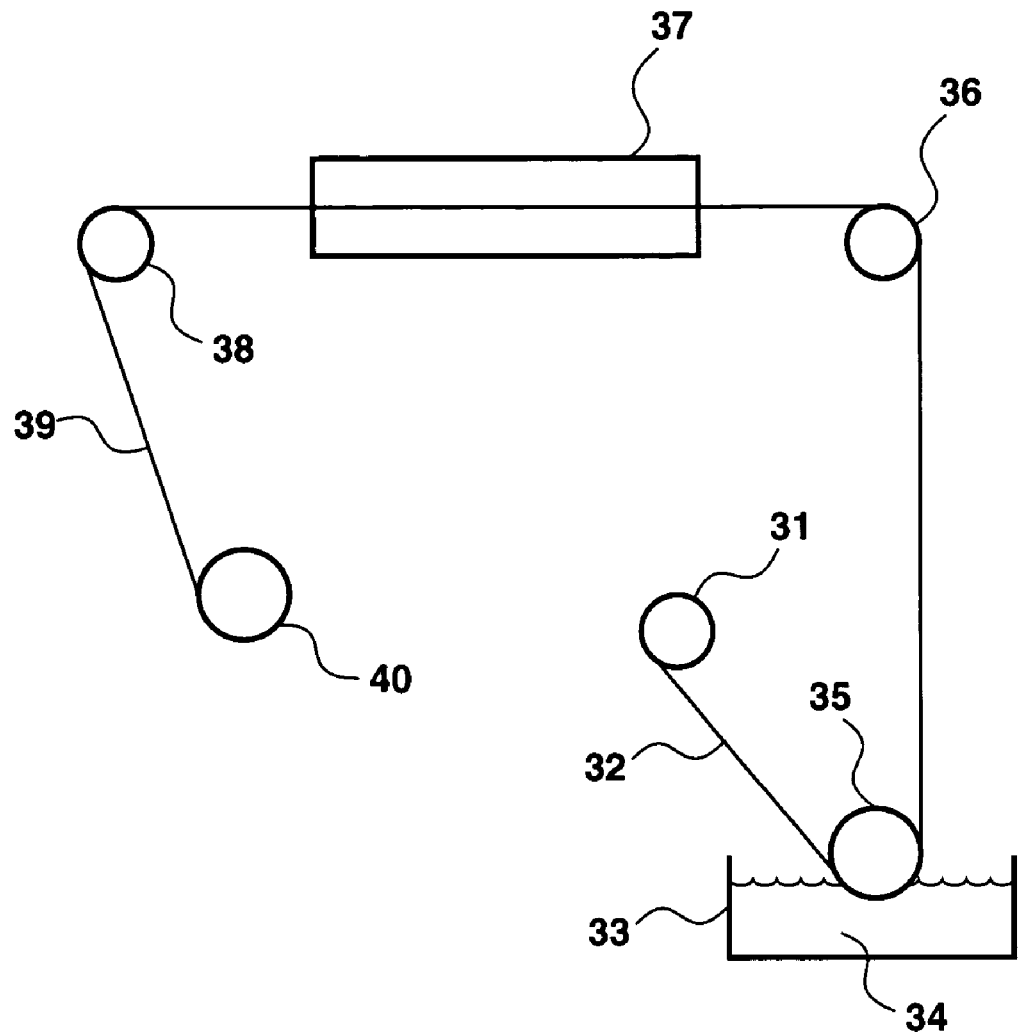
FIG. 3 is a schematic drawing of a dip-coating apparatus and process.

The method as applied specifically to the present coating step is shown in FIG. 3. Referring to this figure, a dilute solution, 34, is prepared by heating the polymer in a large volume of solvent. The solvent that is used will depend on the coating polymer. Since hydrophilic polymers are used, the more polar, hydrophilic organic solvents are preferred, such as alcohols.

If the most preferred polyamide-polyether block copolymers are used as the coating material the most preferred solvent is n-butanol or other aliphatic alcohol.

The coating solution is generally fairly dilute, such as between about 0.1 wt % and 2 wt % polymer, and most preferably between about 0.5 wt % and 1 wt % polymer.

The reverse osmosis membrane, 32 passes from the feed roll, 31, across one or more coating rollers, 35. The dip coating tank, 33, contains the dilute coating polymer solution, 34, which coats the traveling membrane with a liquid layer. The membrane leaves the tank and is carried over roller, 36, into and through drying oven, 37. The dried membrane, 39, passes over roller, 38, and is collected on take-up roll, 40.

After evaporation of the solvent, a polymer coating is left on the membrane. This coating is typically in the range 0.1 to 30 microns thick, and more preferably in the range 0.2 to 5 microns thick.

For use, the membranes are housed in membrane modules. Spiral-wound modules, the standard for the industry, are preferred.

As an alternative to preparing the membranes in flat-sheet form, they may be formed as hollow fibers, as is known in the art, and potted into hollow fiber modules.

In a third aspect, the invention includes reverse osmosis processes using the coated membrane. In its most basic form, the process of the invention includes the following steps:

(a) providing a membrane separation device having a feed side and a permeate side and containing a coated reverse osmosis membrane as described above;
(b) passing a water stream containing a contaminant removable by reverse osmosis across the feed side under reverse osmosis conditions;
(c) removing from the feed side a contaminant-enriched water stream;
(d) removing from the permeate side a treated water stream depleted in the contaminant.

Figure 8:
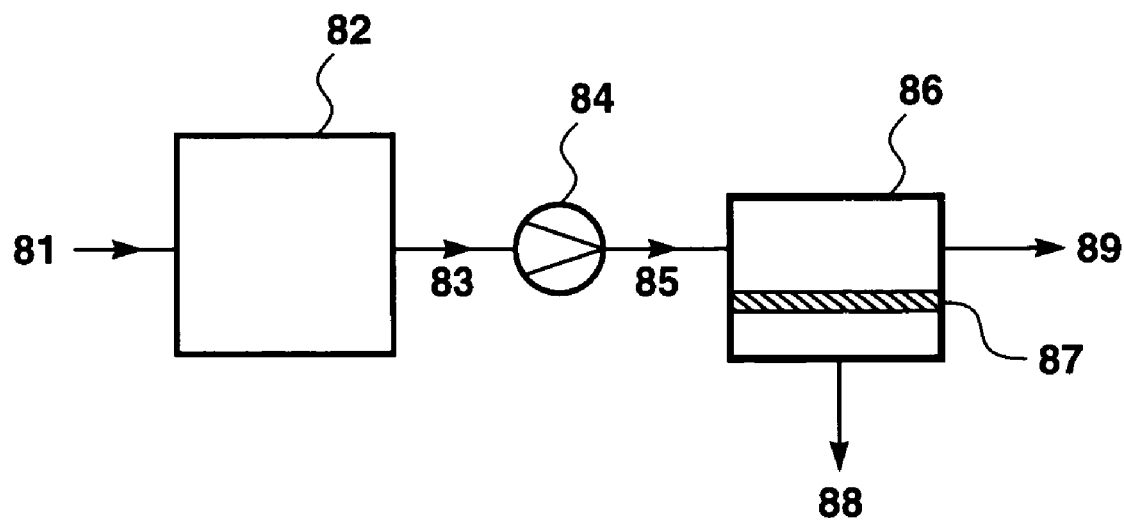
FIG. 8 is a schematic drawing of a reverse osmosis process.

A typical process, including optional pretreatment, is shown in a simple schematic form in FIG. 8. Referring to this figure, raw water stream, 81, enters the process and passes into pretreatment step or steps 82. These steps are not limited in nature, and may include any types of separation step desired to prepare the raw stream for reverse osmosis.

If stream 81 contains suspended material, as will frequently be the case, a typical pretreatment train may start with introduction of flocculant, followed by settling to allow the aggregated solids to drop out. If fine particulates remain, they may be removed by filtering the water through a sand bed, followed by cartridge filtration.

Depending on the nature of the water to be treated, other types of filtration may be desirable in addition to or instead of flocculation and sand filtration. For example, multiple microfiltration steps may be used to removed undissolved matter down to about tenths of a micron in diameter, including colloids and bacteria. If even finer filtration is required, the water may be subjected to ultrafiltration.

Typically, pretreatment also includes scale control to discourage precipitation of salts on the membrane surface. This may be done by acidifying the feed, for example, or by passing the water through an ion-exchange unit to exchange cations that form less soluble salts for cations that form more soluble salts, such as calcium ions for sodium ions.

Another common pretreatment is sterilization, by chlorination or exposure to ultraviolet radiation, to discourage bacterial growth on the membranes. Yet other non-limiting examples of treatment that may be used include carbon adsorption and electrodialysis.

Pretreated stream 83 is then pumped via pump 84 as feed stream 85 to reverse osmosis unit 86. For reverse osmosis to take place, the operating pressure under which feed stream 85 is passed to the membrane modules must exceed the osmotic pressure of the feed stream. Suitable operating pressures are familiar to those of skill in the art, and are generally in the range up to about 1,000 psia, such as for seawater desalination, and down to about 70 psia, such as for low-pressure nanofiltration-type applications.

Reverse osmosis unit 86 is equipped with one or more membrane modules containing coated reverse osmosis membranes, 87, as described above. If the volume flow of feed water to be treated is small, a single module or bank of modules in parallel may be all that is required. For larger streams, a tapered array of modules in series, commonly called a Christmas tree array, is preferred.

The feed water flows across the feed surfaces of the membranes. Treated water, depleted in the contaminant, is withdrawn as permeate stream 88. The concentrate stream is withdrawn from the feed side as retentate stream 89.

The process may include any additional steps as required. For example, either the retentate stream or the permeate stream, or both, may be sent to further treatment, including, but non limited to, other reverse osmosis steps.

Contaminants that may be removed by the process of the invention include all the dissolved inorganic salts traditionally removed by reverse osmosis.

Further, the tolerance of the process for handling streams that contain large solutes, including heavy metal solutes and organic solutes, as well as undissolved matter, such as emulsified oil, colloidal matter, bacteria and particulates, is higher than that of prior art processes. Therefore, the process may be used to handle streams that contain such contaminants, including mixtures of such contaminants.

In some circumstances, this means that a lesser degree of pretreatment is needed than would have been required if prior art reverse osmosis membranes were to be used. For example, if the feed contains small amounts of emulsified oil that would previously have been removed upstream by ultrafiltration, it may be possible to omit the ultrafiltration step.

Although the membranes of the invention are less susceptible to fouling than prior art membranes, cleaning is expected to be required from time to time, and any type of cleaning protocol appropriate to reverse osmosis membranes may be used. A typical cleaning regimen consists of flushing the membrane modules by recirculating the cleaning solution at high speed through the module, followed by a soaking period, followed by a second flush, and so on. Common cleaning agents, including acids to remove scale, alkalis, chelatants and detergents to remove silt and bacteria, and sterilizers to discourage bacterial growth, may be used. In general, as illustrated below, the coated membranes are not damaged by exposure to very acidic or alkaline environments.

It is expected that intervals between cleaning may be longer than were previously needed when handling a comparable feed. For example, if a membrane system handling a wastewater stream would have needed weekly cleanings if prior art membranes were used, it may be possible to operate the system with monthly cleanings.

Because the coated membranes present a dense, non-porous smooth coating to the feed solution, we believe that internal fouling, caused by material trapped inside pores and crevices, cannot occur. Such fouling of the coated membranes as occurs tends to be confined to material adhering on the surface. As a result, the membranes of the invention often recover their flux much better after cleaning than their uncoated counterparts, as illustrated in the Examples section below.

The processes of the invention may be applied to many types of feed stream.

Application areas include the existing large applications of brackish water desalination, seawater desalination and preparation of ultrapure water. In addition, feeds that have previously been more difficult to treat by reverse osmosis, such as municipal wastewaters and industrial wastewaters containing multiple contaminants are more easily treated using the lower fouling, coated membranes of the invention.

A number of specialized applications are also possible, such as treatment of wastewaters from ships, production of potable water on ships, treatment of littoral water for a variety of uses, and a range of "looser" reverse osmosis, also known as nanofiltration, applications.

The invention is now further described by the following examples, which are intended to be illustrative of the invention, but are not intended to limit the scope or underlying principles in any way.

EXAMPLES

Example 1

Water Sorption Tests

Films of different grades of polyether-polyamide block copolymer (Pebax®, ATOFINA Chemicals, Philadelphia, Pa.) are made by coating a solution of each copolymer onto a glass plate. The films are dried in an oven to completely evaporate the solvent. The water sorption capabilities of the resulting dry films are determined by first weighing samples of each film, then immersing the samples in a water bath. The water-soaked samples are taken out of the bath, excess water is removed, and the samples weighed again. The soaking-and-weighing procedure is repeated until no further weight increase is observed.

The water sorption capabilities of various grades of Pebax, expressed as a weight-percent of the original dry weight of the polymer samples, are shown in Table 1.

TABLE 1

| Polymer Type | Copolymer Composition | | Water Sorption (wt %) |
|---|---|---|---|
| | Polyether | Polyamide | |
| PA12-PTMEG(80) | 80% PTMEG | 20% PA-12 | 1.2 |
| PA12-PEG(40) | 40% PEG | 60% PA-12 | 12 |
| PA12-PEG(50) | 50% PEG | 50% PA-12 | 48 |
| PA6-PEG(50) | 50% PEG | 50% PA-6 | 120 |

Based on the water sorption capabilities, the PA12-PEG (50) and the PA6-PEG(50) polymers (Pebax® 1074 or Pebax® 1657 grades, respectively), meet the hydrophilicity requirements of the coating. These grades were used as the coating materials for the membranes prepared in Example 2.

Example 2

Membrane Preparation

Coated composite membranes were prepared from commercial seawater-grade (SWC1 and SWC2) and brackish-water-grade (LFC1) interfacial composite reverse osmosis membranes (Hydranautics, Oceanside, Calif.). The LFC1 membrane is itself a coated membrane, comprising a cross-linked polyamide reverse osmosis membrane (ESPA, Hydranautics, Oceanside, Calif.) coated with a polyvinyl alcohol layer, as described in U.S. Pat. No. 6,413,425.

Dilute solutions of 0.5-1.0% Pebax 1074 or Pebax 1657 grade polymer in n-butanol were prepared by refluxing the solution at 112° C. for 24 hours. Samples of the reverse osmosis membranes were dip-coated in the polymer solution at a coating speed of 1 ft/min and a temperature of 23° C., and then dried in an oven for 30 minutes at 60° C. After complete evaporation of the solvent, a 0.2- to 2.0 µm thick Pebax layer was left on each membrane.

Scanning electron micrographs (SEMs) were taken of both uncoated and coated membranes. FIG. 4 is an SEM of an uncoated LFC1 membrane, showing a rough, ridged, and porous surface.

FIG. 5 is an SEM of a Pebax-coated LFC1 membrane; as discussed above, this membrane surface is continuous and smooth compared to the uncoated membrane in FIG. 4.

FIG. 6 is an SEM of an uncoated SWC1 membrane, again showing a rough, ridged, and porous surface. FIG. 7 is an SEM of a Pebax-coated SWC1 membrane; again, the coated membrane surface is continuous and smooth compared to the uncoated membrane.

Example 3

Membrane Gas Permeation Tests

A series of gas permeation tests were performed with uncoated commercial reverse osmosis membranes and with the same membranes coated in accordance with the invention. Samples of brackish-water-grade LFC and ESPA membranes and seawater-grade SWC membranes (Hydranautics, Oceanside, Calif.) were coated with a layer of Pebax 1657 as in Example 2. Both the uncoated and coated membranes were tested with pure oxygen, nitrogen, and hydrogen in a gas permeation test cell. The feed pressure was 50 psig, the permeate pressure was atmospheric, and the temperature was 23° C. The pressure-normalized fluxes were measured and selectivities calculated. The results are shown in Table 2.

TABLE 2

| Membrane | Pressure-Normalized Flux (GPU*) | | | Selectivity | |
|---|---|---|---|---|---|
| | $N_2$ | $O_2$ | $H_2$ | $O_2/N_2$ | $H_2/N_2$ |
| LFC1 | 18.7 | 16.8 | 64.4 | 0.90 | 3.5 |
| SWC2 | 38.9 | 35.3 | 146 | 0.91 | 3.8 |
| SWC4 | 13.6 | 12.8 | 55.8 | 0.94 | 4.1 |
| ESPA | 13.3 | 12.4 | 55.4 | 0.93 | 4.2 |
| Pebax/LFC1 | 0.0071 | 0.019 | 0.43 | 2.7 | 60 |
| Pebax/SWC2 | 0.039 | 0.15 | 6.0 | 3.8 | 154 |
| Pebax/SWC4 | 0.023 | 0.09 | 4.8 | 3.9 | 209 |
| Pebax/ESPA | 0.025 | 0.055 | 4.3 | 2.2 | 172 |

*1 GPU = 1 × $10^{-6}$ $cm^3$(STP)/$cm^2$ · s · cmHg)

The uncoated membranes exhibited relatively high pressure-normalized flux for all gases. For oxygen/nitrogen, all membranes exhibited selectivity between 0.90 and 0.94. This is consistent with the oxygen/nitrogen Knudsen diffusion selectivity of 0.93. Similarly, all membranes exhibited a hydrogen/nitrogen selectivity between 3.5 and 4.2, consistent with the Knudsen diffusion selectivity for this gas pair of 3.7.

The high pressure-normalized fluxes and Knudsen diffusion gas separation properties confirm that the uncoated membranes have a porous structure with pore sizes in the Knudsen diffusion range (less than about 0.1 micron and more than about 5-10 Å).

After coating with the Pebax layer, the fluxes of all membranes for all gases dropped by orders of magnitude. For example, the nitrogen pressure-normalized flux of the SWC2 membrane dropped from 38.9 GPU to 0.039 GPU, a drop of 1,000-fold.

The gas separation selectivities all increased. The LFC1 oxygen/nitrogen selectivity rose to 2.7 and the hydrogen/nitrogen selectivity to 60. The SWC line of membranes exhibited considerably higher oxygen/nitrogen selectivities of 3.8 and 3.9. The SWC4 and ESPA membranes showed the highest hydrogen/nitrogen selectivities.

All of the selectivities are in the right range for a polyamide membrane. The diversity of the selectivities suggests that the membranes have different types of polyamide as the selective layer.

Examples 4-7

Membrane Reverse Osmosis Permeation Tests

Example 4

Samples of the Pebax-coated LFC1 composite membrane prepared as in Example 2 were cut into 12.6 $cm^2$ stamps and tested with various solutions in a cross-flow six-cell permeation test apparatus. Samples of the uncoated LFC1 membrane were also tested for comparison. First, each membrane was stabilized by running the system overnight with distilled water at 200 psig. Then each membrane was evaluated with the test solution at 500 psig. The temperature of the feed solution was 25° C., and the feed flow rate was 3.2 gpm. The test solutions contained 700 to 2,000 ppm (by weight) solute in water. The flux and rejection of each membrane were measured. The concentrations of salt solutions were measured by conductivity. The concentrations of VOC solutions were measured by total organic carbon analysis (TOC) or gas chromatography. Membrane rejections were calculated to the nearest percent. Results of the tests are shown in Table 3.

TABLE 3

| | Aqueous Solution | Molecular Weight (g/mol) | LFC1 | | Pebax/LFC1 | |
|---|---|---|---|---|---|---|
| | | | Flux (L/$m^2$·h) | Rejection (%) | Flux (L/$m^2$·h) | Rejection (%) |
| Pure Water | — | — | 157 | — | 137 | — |
| Salts | 1,500 ppm NaCl | 85 | 128 | >99 | 91 | >99 |
| | 800 ppm $CuSO_4$ | 160 | 96 | >99 | 58 | >99 |
| Hydrophobic Organics | 1,000 ppm $CH_2Cl_2$ | 85 | 134 | 37 | 84 | 32 |
| | 700 ppm toluene | 92 | 103 | 81 | 78 | 85 |
| | 1,100 ppm TCE | 131 | 77 | 77 | 51 | 86 |
| Hydrophilic Organics | 1,400 ppm ethanol | 46 | 136 | 60 | 80 | 62 |
| | 2,000 ppm isopropanol | 60 | 114 | 98 | 84 | 97 |
| | 2,000 ppm acetic acid | 60 | 99 | 69 | 77 | 77 |
| | 1,000 ppm MEK | 72 | 123 | 76 | 77 | 83 |
| | 2,000 ppm DMAC | 87 | 111 | 96 | 70 | 97 |
| | 2,000 ppm MTBE | 88 | 97 | >99 | 63 | >99 |
| | 2,000 ppm glycerol | 92 | 111 | 98 | 71 | >99 |
| | 1,400 ppm citric acid | 192 | 100 | 96 | 65 | 98 |
| Surfactants | 900 ppm n-decane sulfonic acid sodium salt | 244 | 88 | >99 | 56 | >99 |
| | 1,000 ppm benzyldimethyl-hexadecyl ammonium chloride | 396 | 42 | >99 | 29 | >99 |

Example 5

Samples of the uncoated SWC1 membrane and the Pebax-coated SWC1 composite membrane prepared as in Example 2 were cut into 12.6 cm² stamps and tested with various solutions as in Example 4. The results are shown in Table 4.

TABLE 4

|  | Aqueous Solution | Molecular Weight (g/mol) | SWC1 Flux (L/m²·h) | SWC1 Rejection (%) | Pebax/SWC1 Flux (L/m²·h) | Pebax/SWC1 Rejection (%) |
|---|---|---|---|---|---|---|
| Pure Water | — | — | 79 | — | 43 | — |
| Salts | 1,500 ppm NaCl | 85 | 69 | >99 | 27 | >99 |
|  | 800 ppm CuSO₄ | 160 | 45 | >99 | 26 | >99 |
| Hydrophobic Organics | 1,000 ppm CH₂Cl₂ | 85 | 56 | 61 | 28 | 59 |
|  | 700 ppm toluene | 92 | 44 | 90 | 25 | 92 |
|  | 1,100 ppm TCE | 131 | 37 | 91 | 21 | 97 |
| Hydrophilic Organics | 1,400 ppm ethanol | 46 | 49 | 84 | 28 | 82 |
|  | 2,000 ppm isopropanol | 60 | 66 | >99 | 27 | >99 |
|  | 2,000 ppm acetic acid | 60 | 55 | 90 | 24 | 91 |
|  | 1,000 ppm MEK | 72 | 45 | 96 | 26 | 95 |
|  | 2,000 ppm DMAC | 87 | 65 | 99 | 20 | 95 |
|  | 2,000 ppm MTBE | 88 | 51 | >99 | 21 | >99 |
|  | 2,000 ppm glycerol | 92 | 47 | >99 | 28 | >99 |
|  | 1,400 ppm citric acid | 192 | 45 | >99 | 26 | >99 |
| Surfactants | 900 ppm n-decane sulfonic acid sodium salt | 244 | 43 | >99 | 25 | >99 |
|  | 1,000 ppm benzyldimethyl-hexadecyl ammonium chloride | 396 | 26 | >99 | 17 | >99 |

Example 6

Samples of the uncoated SWC2 membrane and the Pebax-coated SWC2 composite membrane prepared as in Example 2 were cut into 12.6 cm² stamps and tested with various solutions as in Example 4. The results are shown in Table 5.

TABLE 5

|  | Aqueous Solution | Molecular Weight (g/mol) | SWC2 Flux (L/m²·h) | SWC2 Rejection (%) | Pebax/SWC2 Flux (L/m²·h) | Pebax/SWC2 Rejection (%) |
|---|---|---|---|---|---|---|
| Pure Water | — | — | 88 | — | 58 | — |
| Salts | 1,500 ppm NaCl | 85 | 78 | >99 | 24 | >99 |
|  | 800 ppm CuSO₄ | 160 | 49 | >99 | 27 | >99 |
| Hydrophobic Organics | 1,000 ppm CH₂Cl₂ | 85 | 56 | 61 | 36 | 53 |
|  | 700 ppm toluene | 92 | 51 | 93 | 32 | 94 |
|  | 1,100 ppm TCE | 131 | 44 | 88 | 24 | 90 |
| Hydrophilic Organics | 1,400 ppm ethanol | 46 | 57 | 78 | 35 | 78 |
|  | 2,000 ppm isopropanol | 60 | 73 | 98 | 28 | 98 |
|  | 2,000 ppm acetic acid | 60 | 63 | 84 | 20 | 86 |
|  | 1,000 ppm MEK | 72 | 54 | 94 | 34 | 92 |
|  | 2,000 ppm DMAC | 87 | 65 | 99 | 12 | 96 |
|  | 2,000 ppm MTBE | 88 | 50 | 99 | 12 | 96 |
|  | 2,000 ppm glycerol | 92 | 55 | 99 | 32 | 98 |
|  | 1,400 ppm citric acid | 192 | 46 | >99 | 28 | >99 |
| Surfactants | 900 ppm n-decane sulfonic acid sodium salt | 244 | 45 | >99 | 27 | >99 |
|  | 1,000 ppm benzyldimethyl-hexadecyl ammonium chloride | 396 | 34 | >99 | 18 | >99 |

As can be seen from the results shown in Tables 3, 4, and 5, the solute rejections of Pebax-coated membranes were comparable to those of the uncoated membranes, or in some cases slightly higher. The coating did not have any significant effect on the rejection properties of the membranes. However, the water fluxes of the Pebax-coated membranes were significantly lower than those of the corresponding uncoated membranes. The least percentage drop in flux was seen in the LFC membrane.

Example 7

Figure 9:
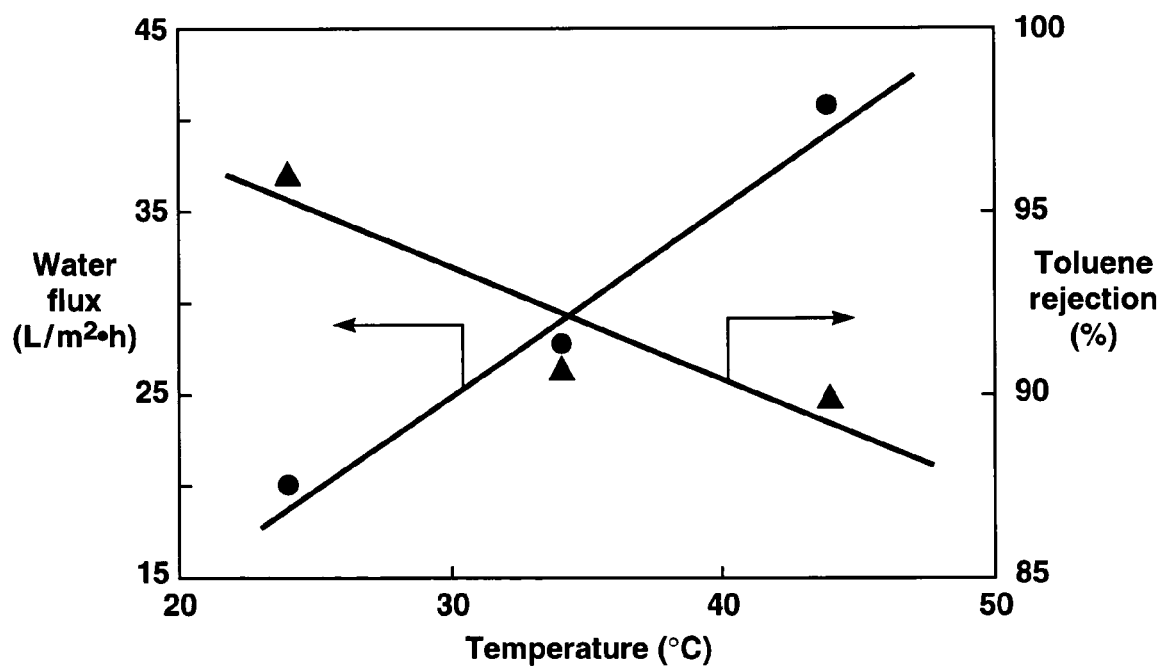
FIG. 9 is a graph showing water flux and toluene rejection of a Pebax-coated SWC1 membrane stamp as a function of time.

A permeation experiment was performed to measure the effect of temperature on flux and rejection. A Pebax-coated SWC1 membrane stamp was tested with a 500-ppm toluene aqueous solution as in Example 4. The feed pressure was 500 psig and the feed temperature was varied at 24° C., 34° C. and 44° C. The results of the experiment are shown in FIG. 9.

As can be seen, the membrane flux increases significantly as temperature increases; toluene rejection decreases, from about 95% to 90%.

Examples 8-10

Chemical Stability Tests

Example 8

A series of tests were performed in the six-cell test apparatus to determine the chemical stability of the uncoated and Pebax-coated membranes in the presence of oxidizing agents. The membranes were tested with an aqueous solution of sodium hypochlorite (NaOCl) for 10 hours at 200 ppm NaOCl, then for three hours at 300 ppm NaOCl, and finally for two hours at 540 ppm NaOCl. Fresh NaOCl solution was used for each test. The feed temperature was 25° C., the feed flow rate was 3.2 gpm, and the feed pressure was 500 psig. The water flux and solute rejection of the membranes were measured. The results of the tests are shown in Table 6.

TABLE 6

| Membranes | 200 ppm NaOCl (10 hours) | | 300 ppm NaOCl (3 hours) | | 540 ppm NaOCl (2 hours) | |
|---|---|---|---|---|---|---|
| | Flux (L/ $m^2 \cdot h$) | Rejection (%) | Flux (L/ $m^2 \cdot h$) | Rejection (%) | Flux (L/ $m^2 \cdot h$) | Rejection (%) |
| LFC1 | 119 | >99 | 116 | >99 | 115 | >99 |
| Pebax/LFC1 | 82 | >99 | 81 | >99 | 78 | >99 |
| SWC1 | 60 | >99 | 59 | >99 | 59 | >99 |
| Pebax/SWC1 | 30 | >99 | 28 | >99 | 28 | >99 |
| SWC2 | 74 | >99 | 71 | >99 | 70 | >99 |
| Pebax/SWC2 | 36 | >99 | 35 | >99 | 34 | >99 |

For all membranes, NaOCl rejection remained high (>99%) and flux decreased only slightly with the increasing NaOCl concentration. The membranes were essentially unaffected by exposure to solutions containing up to 540 ppm NaOCl for a total of 15 hours.

Example 9

A series of tests were performed in the six-cell test apparatus to determine the chemical stability of the uncoated and Pebax-coated membranes under acidic conditions. The membranes were first tested with a 1,500-ppm NaCl solution (pH 8) at 500 psig and 25° C. The pH of the solution was then adjusted to 3 by adding hydrochloric acid (HCl) to the NaCl solution. The pH, water flux, and NaCl rejection were measured for five hours. The solution was then drained and the system flushed with distilled water. Water flux, rejection, and pH were remeasured with fresh 1,500-ppm NaCl solution. Results before and after exposure to the highly acidic (pH 3) solution are shown in Table 7.

TABLE 7

| Membranes | 1,500 ppm NaCl Before Addition of HCl (pH = 8) | | 1,500 ppm NaCl After Addition of HCl (pH = 3) | | 1,500 ppm NaCl (Fresh Solution) (pH = 6) | |
|---|---|---|---|---|---|---|
| | Flux (L/ $m^2 \cdot h$) | Rejection (%) | Flux (L/ $m^2 \cdot h$) | Rejection (%) | Flux (L/ $m^2 \cdot h$) | Rejection (%) |
| LFC1 | 135 | >99 | 126 | 71 | 113 | 89 |
| Pebax/LFC1 | 86 | >99 | 76 | 85 | 76 | >99 |
| SWC1 | 67 | >99 | 58 | 94 | 57 | >99 |
| Pebax/SWC1 | 25 | >99 | 21 | 96 | 21 | >99 |
| SWC2 | 68 | >99 | 60 | 87 | 58 | >99 |
| Pebax/SWC2 | 24 | >99 | 19 | 93 | 19 | >99 |

The results showed the flux and NaCl rejections of all membranes dropped after the addition of HCl to the feed solution. After the system was flushed with distilled water and tests rerun with a fresh NaCl solution, the pH only rose to 6, indicating that the acid in the solution was not removed completely. The flux through the uncoated LFC1 membrane dropped significantly and NaCl rejection was only partially restored. However, the fluxes through the SWC1, SWC2 and all the Pebax-coated membranes were the same as the fluxes in acidic solution; NaCl rejections were restored to their initial values.

Example 10

A series of tests were performed in the six-cell test apparatus to determine the chemical stability of the uncoated and Pebax-coated membranes under basic conditions. The membranes were first tested with a 1,500-ppm NaCl solution (pH 8) at 500 psig and 25° C., and the pH, water flux and NaCl rejection were measured. The pH of the solution was then adjusted to 11-12 by adding sodium hydroxide (NaOH) to the NaCl solution. The pH, water flux, and NaCl rejection were measured over a five-day period. Results before and after exposure to very basic (pH 11-12) solution are shown in Table 8.

TABLE 8

| Membranes | 1,500 ppm NaCl (pH = 8) | | 1,500 ppm NaCl (pH = 12, day 1) | | 1,500 ppm NaCl (pH = 11, day 5) | |
|---|---|---|---|---|---|---|
| | Flux (L/ $m^2 \cdot h$) | Rejection (%) | Flux (L/ $m^2 \cdot h$) | Rejection (%) | Flux (L/ $m^2 \cdot h$) | Rejection (%) |
| LFC1 | 114 | 98 | 108 | 98 | 94 | 98 |
| Pebax/LFC1 | 57 | >99 | 65 | >99 | 65 | >99 |
| SWC2 | 55 | >99 | 65 | >99 | 70 | >99 |
| Pebax/SWC2 | 26 | >99 | 29 | >99 | 36 | >99 |

The NaCl rejections remained high for all the membranes before and after exposure to the basic solution. The flux of the LFC1 membrane declined with time; in contrast, the fluxes of the other membranes increased slightly.

Examples 11-16

Tests of Membrane Resistance to Fouling by an Oil Emulsion

Example 11

Figure 10:
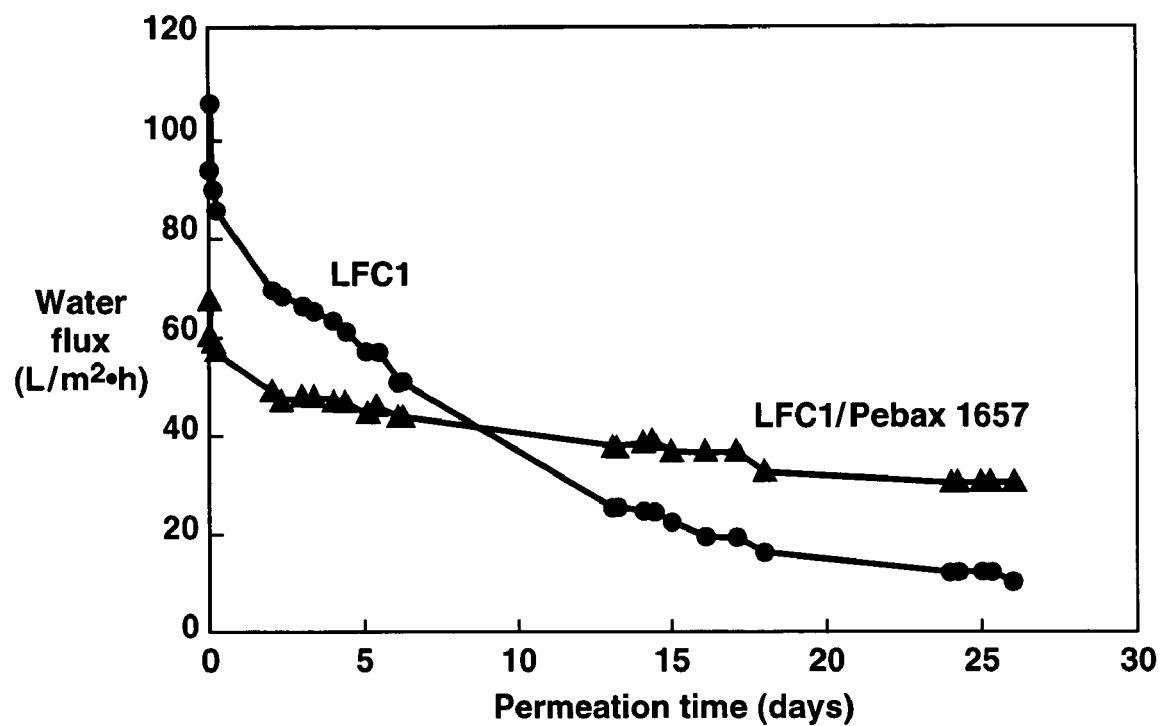
FIG. 10 is a graph showing water flux of uncoated and Pebax-coated LFC1 membrane stamps as a function of time.

A series of tests were performed to compare the fouling resistance of the uncoated LFC1 membranes to that of the Pebax-coated LFC1 membranes. The tests were performed in the permeation test cell apparatus at a pressure of 500 psig, a temperature of 25° C., and a feed flow rate of 1.7 gpm. The feed mixture was an emulsion of 900 ppmw mineral oil stabilized with 100 ppmw neutral silicone-based surfactant. The water fluxes were measured periodically for nearly four weeks. The results of the tests are shown in FIG. 10.

Over the four-week duration of the test, the flux of the uncoated LFC1 membrane decreased by an order of magnitude, from over 100 L/m²·h to about 10 L/m²·h. In contrast, the flux of the Pebax-coated membrane declined by about half, from about 65 L/m²·h to about 30 L/m²·h. Thus, the flux decline observed with the coated membrane was five-fold less than that observed with the uncoated membrane. The flux of the coated membrane was higher than that of the uncoated membrane for 18 of the 26 days of the test.

Example 12

Figure 11:
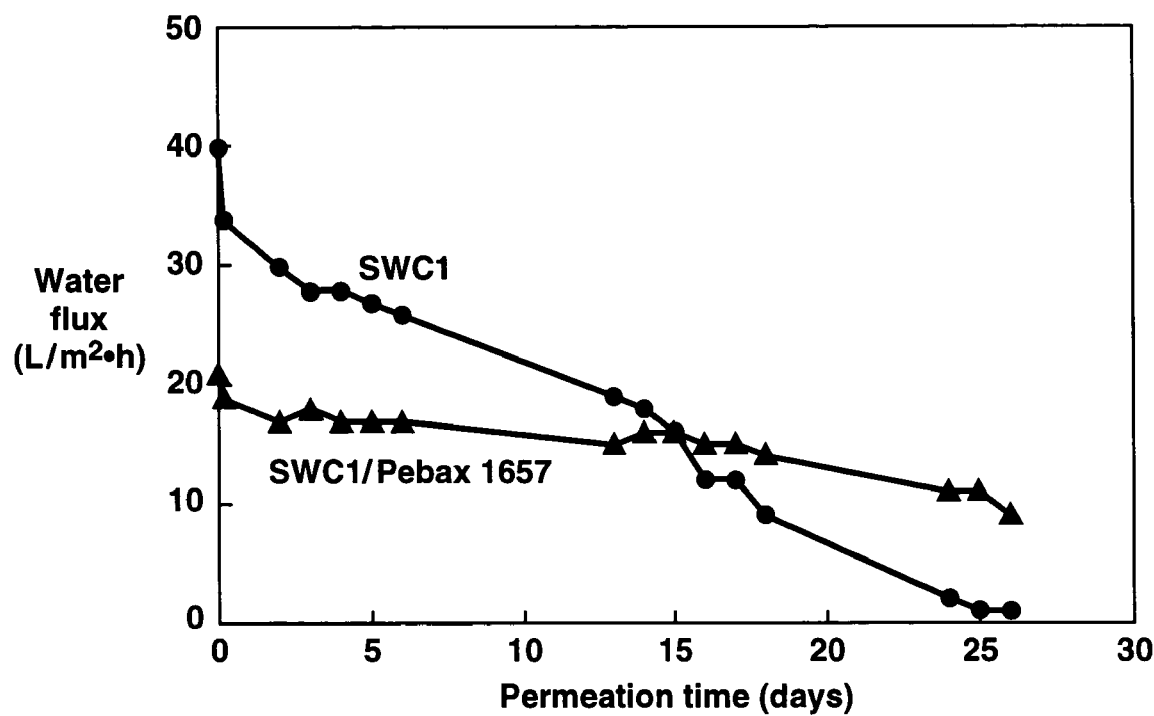
FIG. 11 is a graph showing water flux of uncoated and Pebax-coated SWC1 membrane stamps as a function of time.

The tests of Example 11 were repeated with uncoated and Pebax-coated SWC1 membranes. All test parameters were as in Example 11. The results are shown in FIG. 11.

Over the four-week duration of the test, the flux of the uncoated SWC1 membrane decreased from about 40 L/m²·h to almost zero. In contrast, the flux of the Pebax-coated membrane declined from about 20 L/m²·h to about 10 L/m²·h. The flux of the coated membrane was higher than that of the uncoated membrane for 11 of the 26 days of the test.

Example 13

Figure 12:
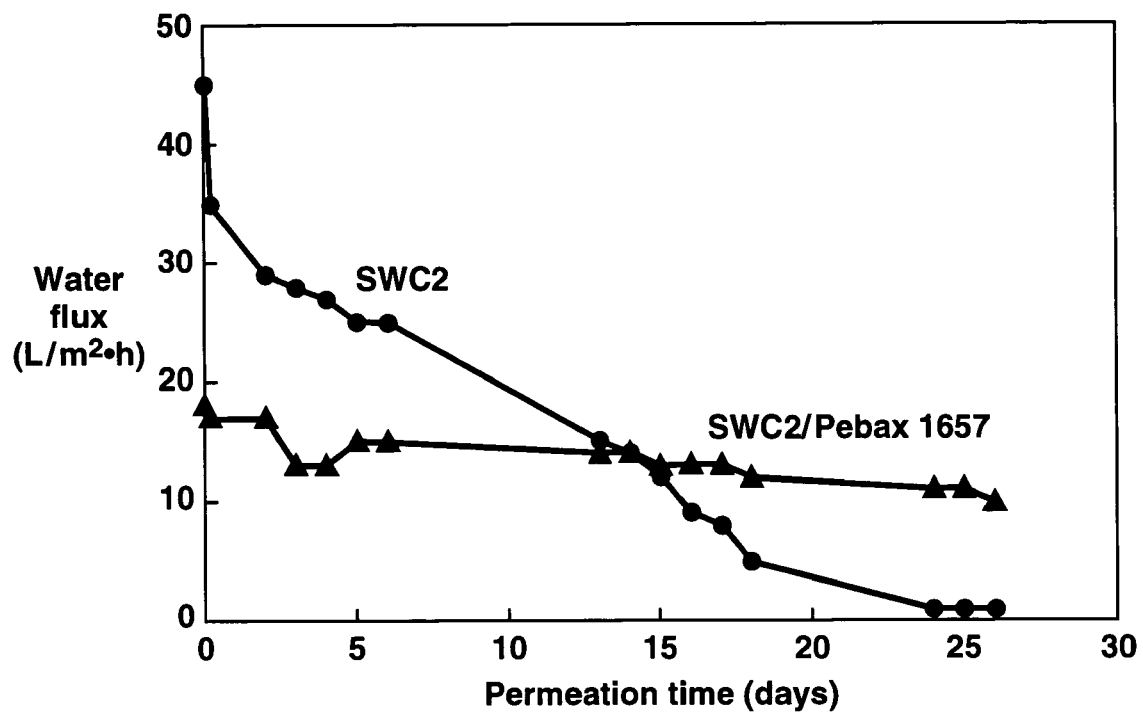
FIG. 12 is a graph showing water flux of uncoated and Pebax-coated SWC2 membrane stamps as a function of time.

The tests of Example 11 were repeated with uncoated and Pebax-coated SWC2 membranes. All test parameters were as in Example 11. The results are shown in FIG. 12.

Over the four-week duration of the test, the flux of the uncoated SWC2 membrane decreased from about 45 L/m²·h to almost zero. In contrast, the flux of the Pebax-coated membrane declined from about 20 L/m²·h to about 10 L/m²·h. The flux of the coated membrane was higher than that of the uncoated membrane for 13 of the 26 days of the test.

Example 14

Figure 13:
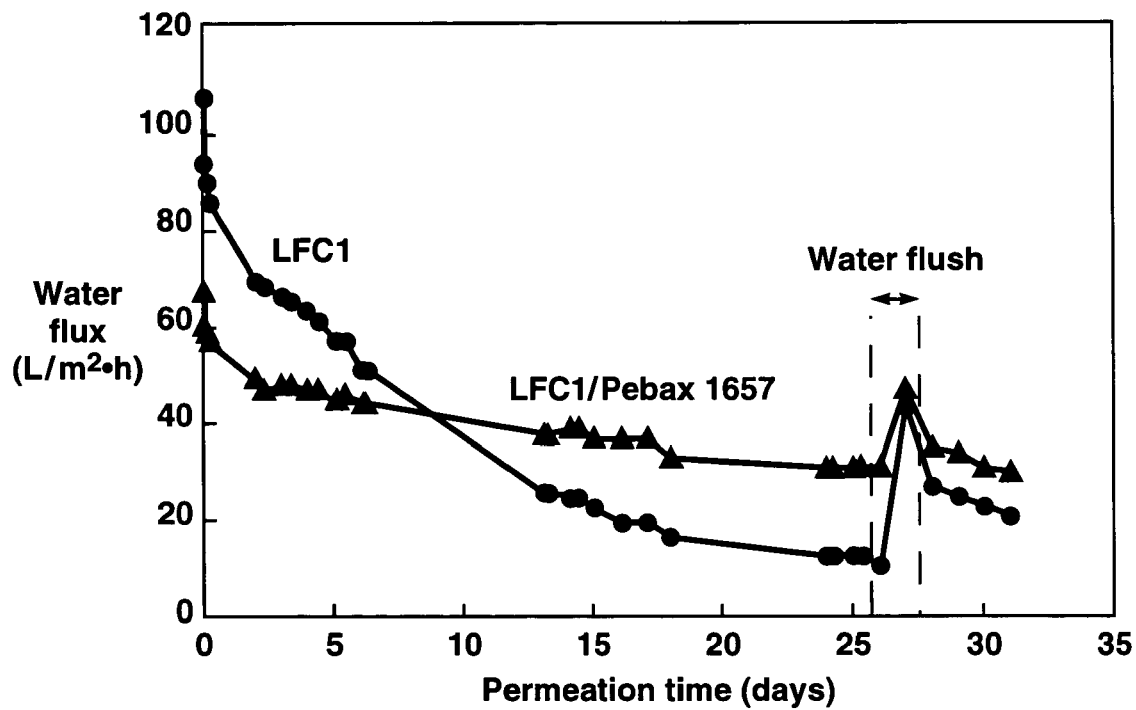
FIG. 13 is a graph showing water flux of uncoated and Pebax-coated LFC1 membrane stamps before and after water-flushing of the membrane surface.

After four weeks, the LFC1 membranes of Example 11 were flushed with clean water for 24 hours and retested with the 1,000-ppm oil emulsion. As shown in FIG. 13, the flux of the uncoated LFC1 membrane increased to about 45 L/m²·h when the membrane was flushed with water, but declined to about 20 L/m²·h when the membrane was retested with the oil emulsion. The flux of the Pebax-coated membrane was restored to about 50 L/m²·h.

Example 15

Figure 14:
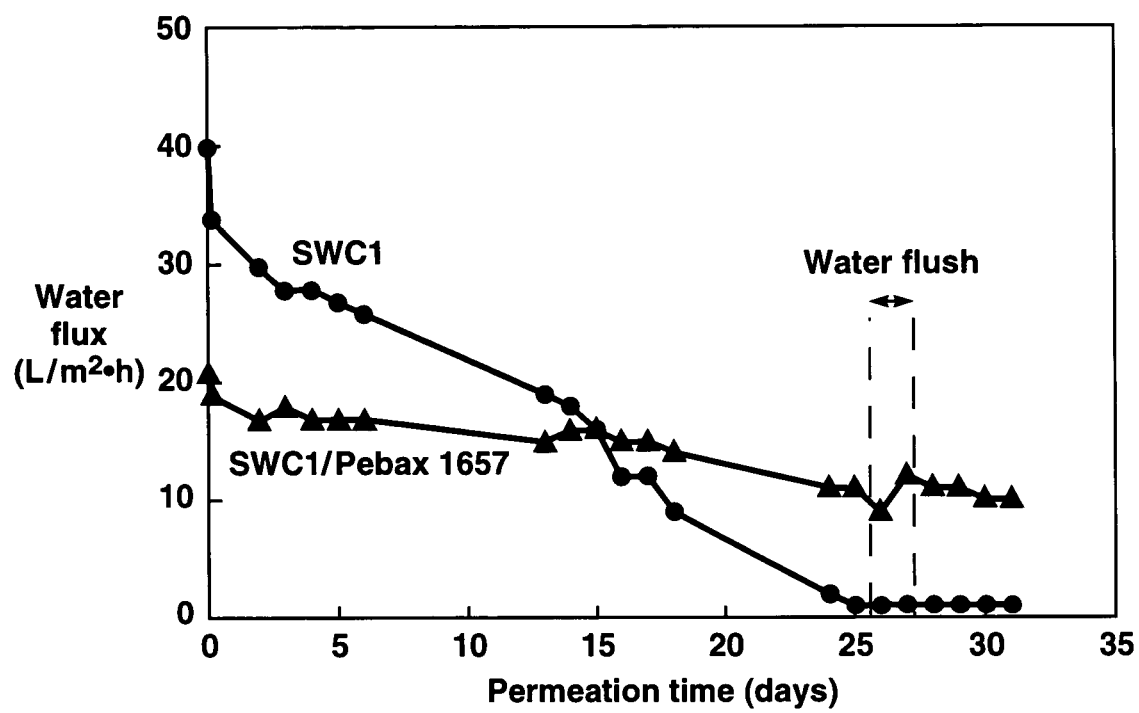
FIG. 14 is a graph showing water flux of uncoated and Pebax-coated SWC1 membrane stamps before and after water-flushing of the membrane surface.

After four weeks, the SWC1 membranes of Example 12 were flushed with clean water and retested as in Example 14. As shown in FIG. 14, the flux of the uncoated SWC1 showed no recovery when flushed with water, indicating complete internal fouling of the membrane. The flux of the Pebax-coated membrane was restored to about 12 L/m²·h.

Example 16

Figure 15:
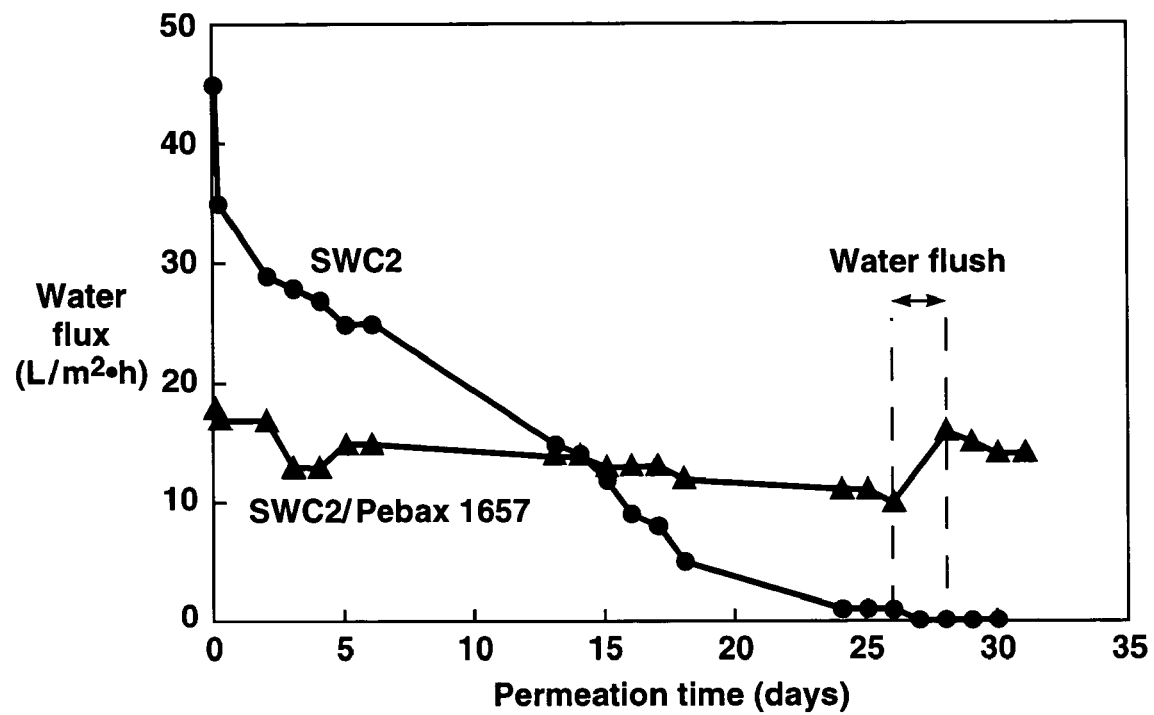
FIG. 15 is a graph showing water flux of uncoated and Pebax-coated SWC2 membrane stamps before and after water-flushing of the membrane surface.

After four weeks, the SWC2 membranes of Example 13 were flushed with clean water and retested as in Example 14. As shown in FIG. 15, the flux of the uncoated SWC2 showed no recovery when flushed with water, again indicating complete internal fouling of the membrane. The flux of the Pebax-coated membrane was restored almost to its initial value of about 20 L/m²·h.

As can be seen from the results in FIGS. 13-15, the Pebax layer used to coat the membranes reduced the initial water fluxes compared to the uncoated membranes, but provided significant protection from membrane fouling.

Examples 17-19

Tests of Membrane Resistance to Fouling by Oil Emulsion Mixtures

Example 17 VOC/Oil Emulsion Mixture

Figure 17:
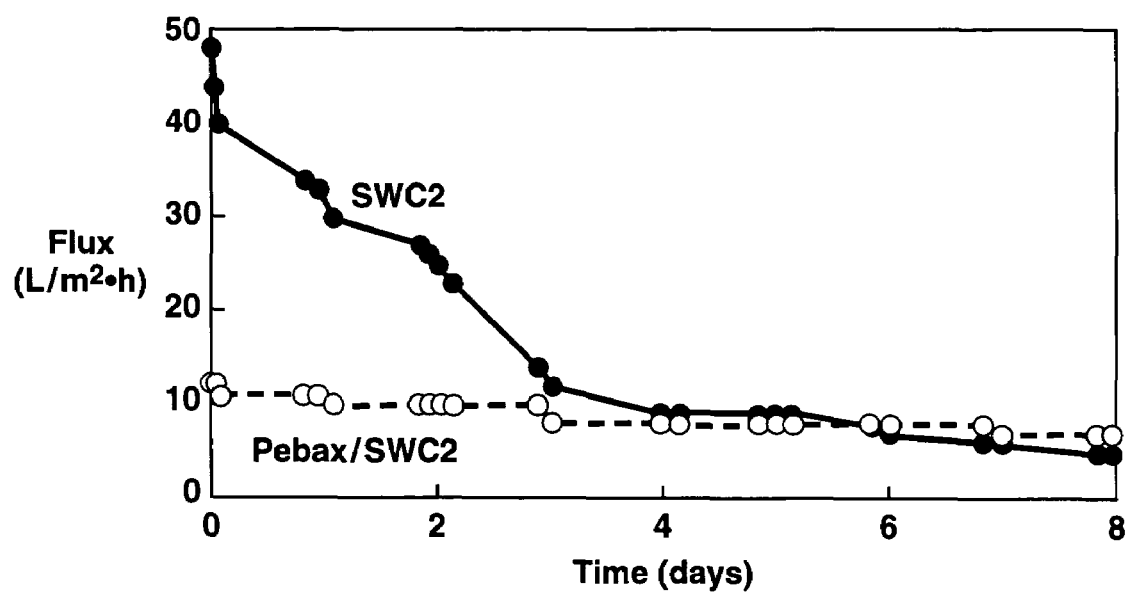
FIG. 17 is a graph showing water flux of uncoated and Pebax-coated SWC2 membrane stamps as a function of time, when tested with a VOC/oil emulsion mixture.

A test was performed to compare the fouling resistance of an uncoated membrane to that of a Pebax-coated membrane with a more complex feed solution. Uncoated and Pebax-coated SWC2 membranes were tested in the permeation test-cell apparatus at a pressure of 500 psig, a temperature of 25° C., and a feed flow rate of 1.7 gpm. The feed solution was a VOC/oil emulsion mixture, comprising:

900 ppm mineral oil
100 ppm surfactant DC193
100 ppm trichloroethylene (TCE)
100 ppm methylethylketone (MEK)
100 ppm citric acid The water fluxes and rejections were measured periodically for eight days. The results of the tests are shown in FIG. 17.

As can be seen, the flux of the uncoated SWC2 membrane decreased significantly over the duration of the test, from nearly 50 L/m²·h to about 7 L/m²·h. The flux of the coated SWC2 membrane remained nearly constant at about 10 L/m²·h, indicating almost complete absence of fouling. The TCE rejection was 97%, and the MEK rejection was 96%.

Example 18

Figure 16:
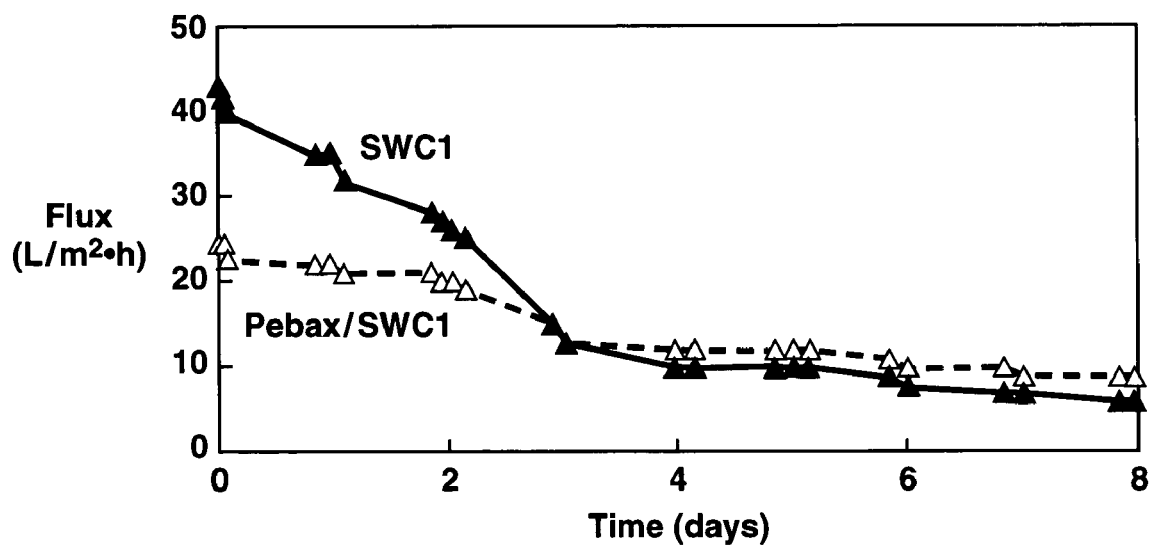
FIG. 16 is a graph showing water flux of uncoated and Pebax-coated SWC1 membrane stamps as a function of time, when tested with a VOC/oil emulsion mixture.

The test of Example 17 was repeated with uncoated and Pebax-coated SWC1 membranes. The results are shown in FIG. 16.

As can be seen, the flux of the uncoated SWC1 membrane decreased significantly, from more than 40 L/m²·h to about 7 L/m²·h, over the duration of the test. The flux of the coated SWC1 membrane decreased from about 22 L/m²·h to about 10 L/m²·h. The flux of the coated membrane was higher than that of the uncoated membrane for days 3 through 8 of the test. The TCE rejection was again 97%, and the MEK rejection was 96%.

Example 19

Heavy-Metal/Oil Emulsion Mixture

The test of Example 17, with uncoated and Pebax-coated SWC2 membranes, was repeated with a heavy-metal/oil emulsion mixture comprising:

900 ppm mineral oil
100 ppm surfactant DC193
200 ppm magnesium sulfate (MgSO$_4$)
200 ppm cupric sulfate (CuSO$_4$)
200 ppm ferrous sulfate (FeSO$_4$)

Figure 18:
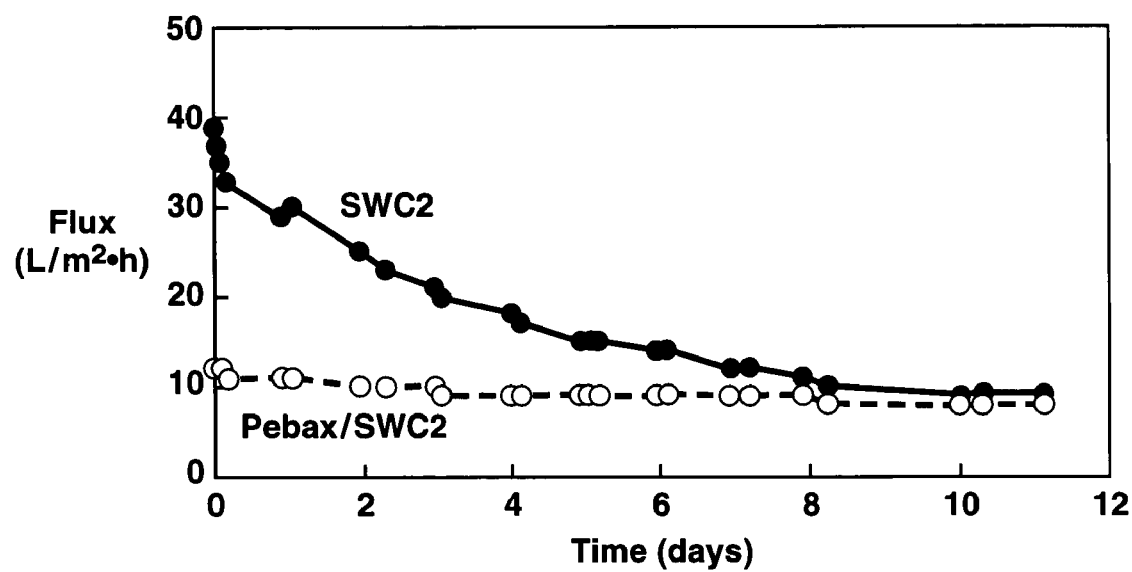
FIG. 18 is a graph showing water flux of uncoated and Pebax-coated SWC2 membrane stamps as a function of time, when tested with a heavy-metal/oil emulsion mixture.

All other parameters were as in Example 17, except that the water fluxes and rejections were measured periodically for 11 days. The results of the tests are shown in FIG. 18.

As can be seen, the flux of the uncoated SWC2 membrane decreased significantly, from about 40 L/m$^2$·h to about 10 L/m$^2$·h, over the duration of the test. The flux of the coated SWC2 membrane again remained nearly constant at about 10 L/m$^2$·h, indicating almost complete absence of fouling. The rejection for all the metal salts was >99%.

We claim:

1. A coated reverse osmosis membrane, comprising a reverse osmosis membrane having reverse osmosis rejection capabilities in an uncoated state, coated with an essentially continuous, defect-free, non-porous, hydrophilic coating layer prepared from a water-insoluble polymer, and characterized in that the coating layer does not change the reverse osmosis rejection capabilities by more than 10% in either direction.

2. The coated reverse osmosis membrane of claim 1, wherein the reverse osmosis membrane is a thin-film composite membrane.

3. The coated reverse osmosis membrane of claim 1, wherein the reverse osmosis membrane is prepared by interfacial polymerization.

4. The coated reverse osmosis membrane of claim 1, wherein the reverse osmosis membrane comprises a polyamide selective layer.

5. The coated reverse osmosis membrane of claim 1, wherein the coating layer comprises a rubbery polymer.

6. The coated reverse osmosis membrane of claim 1, wherein the coating layer comprises an electrically neutral polymer.

7. The coated reverse osmosis membrane of claim 1, wherein the coating layer comprises a polyamide-polyether block copolymer.

8. The coated reverse osmosis membrane of claim 1, wherein the coating layer comprises a polymer having the general formula

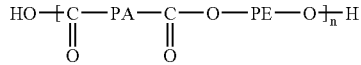

where PA is a polyamide segment, PE is a polyether segment and n is a positive integer.

9. The coated reverse osmosis membrane of claim 8, wherein the polyether and polyamide segments are present in a proportion of at least about 50% polyether segments.

10. The coated reverse osmosis membrane of claim 1, characterized in that it exhibits a gas separation selectivity in favor of oxygen over nitrogen of at least about 2.

11. The coated reverse osmosis membrane of claim 1, characterized in that it exhibits a gas separation selectivity in favor of hydrogen over nitrogen of at least about 20.

12. A process for treating water containing a contaminant removable by reverse osmosis, comprising the step of:
    (a) providing a membrane separation device having a feed side and a permeate side and containing the coated reverse osmosis membrane of claim 1;
    (b) passing the water across the feed side under reverse osmosis conditions;
    (c) removing from the feed side a contaminant-enriched water stream;
    (d) removing from the permeate side a treated water stream depleted in the contaminant.

13. The process of claim 12, wherein the reverse osmosis membrane is a thin-film composite membrane having a polyamide selective layer, and wherein the coating layer comprises a polyamide-polyether block copolymer.

14. The process of claim 12, wherein the contaminant is a dissolved contaminant selected from the group consisting of inorganic salts and organic compounds.

15. The process of claim 12, wherein the water is industrial wastewater.

16. The process of claim 12, wherein the water is seawater.

17. The process of claim 12, wherein the water is brackish water.

18. The process of claim 12, carried out on a ship.

19. The process of claim 12, wherein the water comprises a material selected from the group consisting of oils, surfactants, heavy metal compounds and bacteria.

20. A process for reducing a propensity of a reverse osmosis membrane to fouling, comprising:
    (a) provided a reverse osmosis membrane having reverse osmosis rejection capabilities in an uncoated state;
    (b) depositing on a surface of the reverse osmosis membrane an essentially continuous, defect-free, non-porous, hydrophilic coating layer prepared from a water-insoluble polymer, whereby the propensity to fouling is reduced.

* * * * *